March 12, 1929.  L. P. ERB  1,705,359

ROTARY COMBUSTION ENGINE

Filed Oct. 14, 1922  17 Sheets-Sheet 1

Fig. 1.

Lanious P. Erb,
INVENTOR,

WITNESSES
Howard D. Orr.
Harry E. Deidel

BY
ATTORNEY

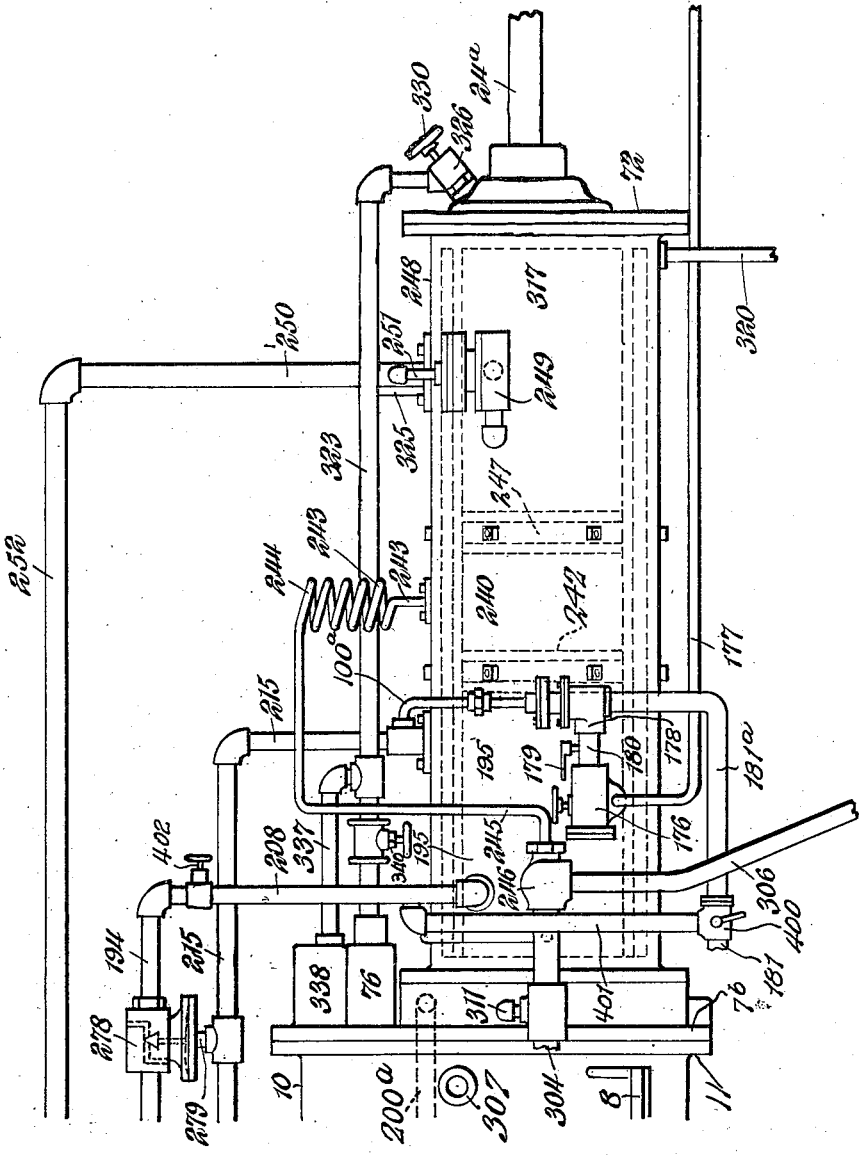

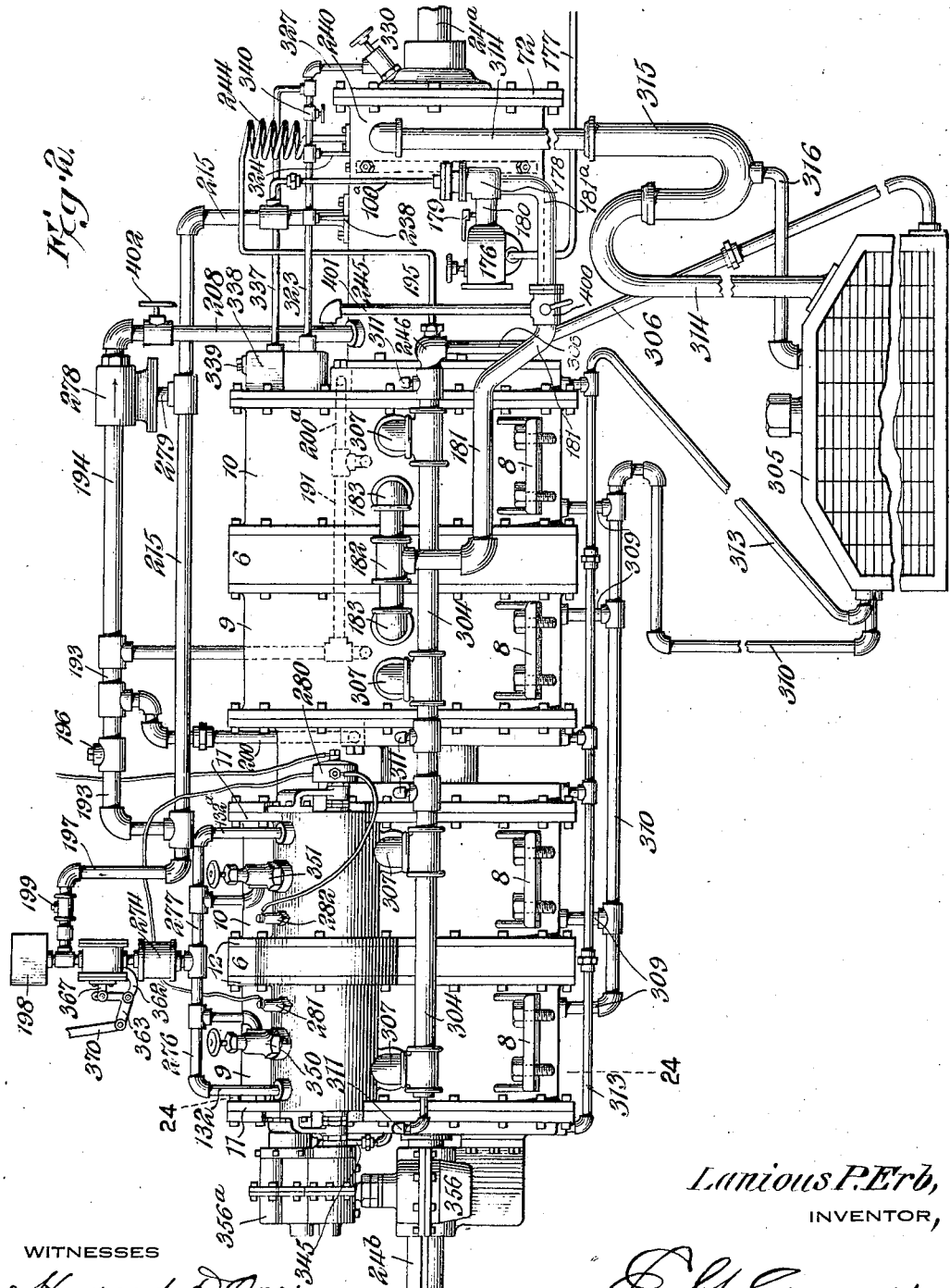

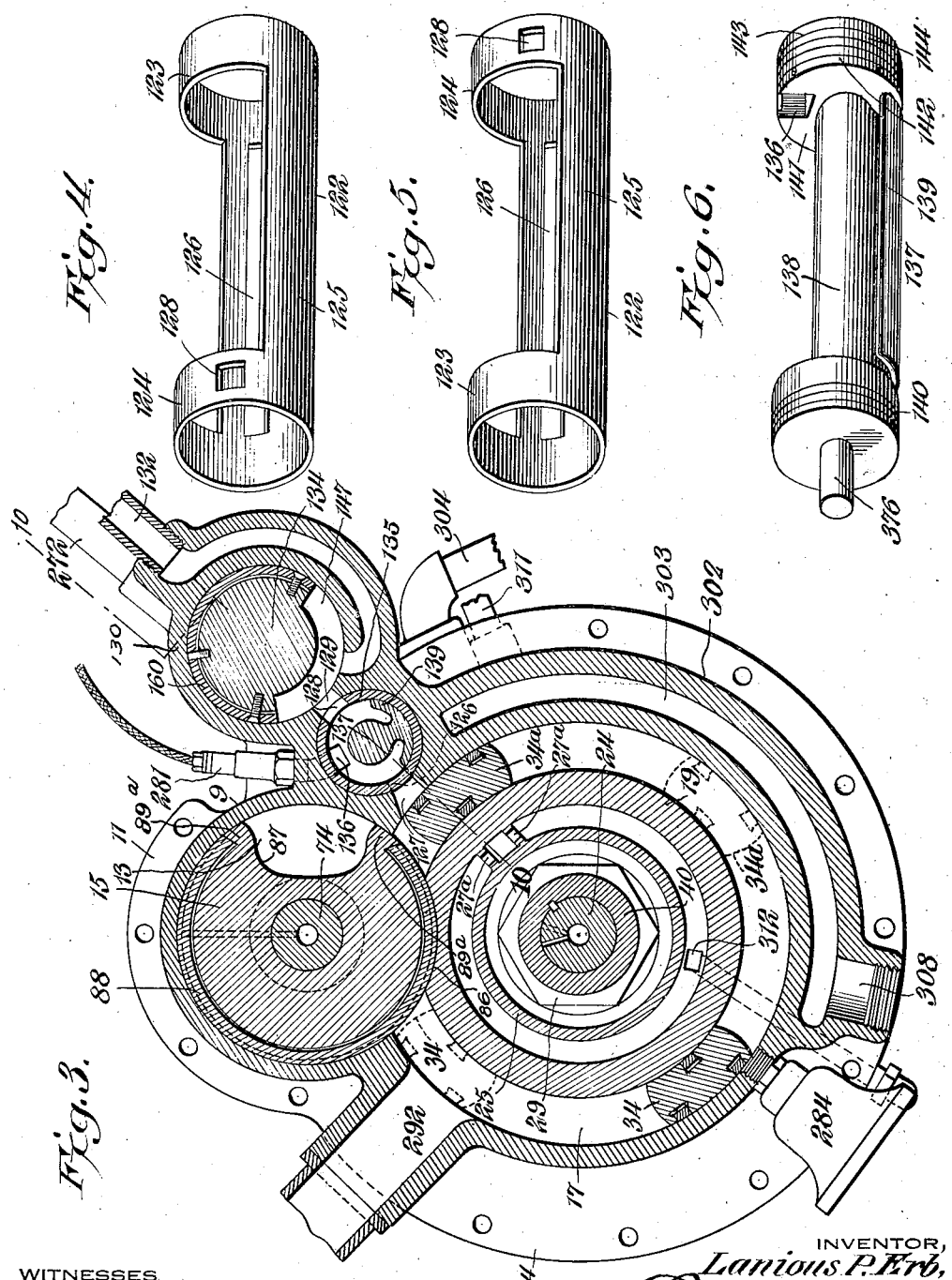

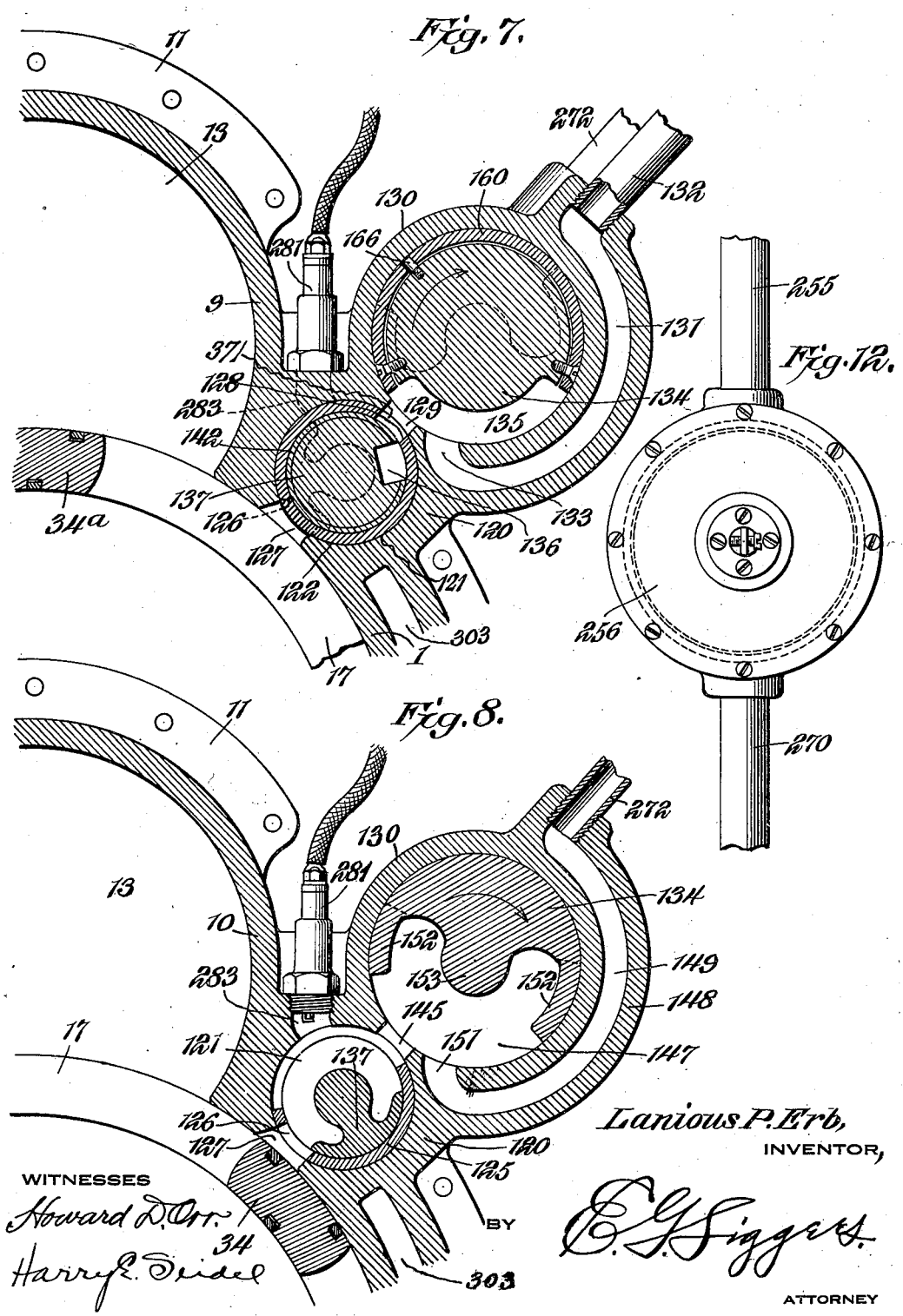

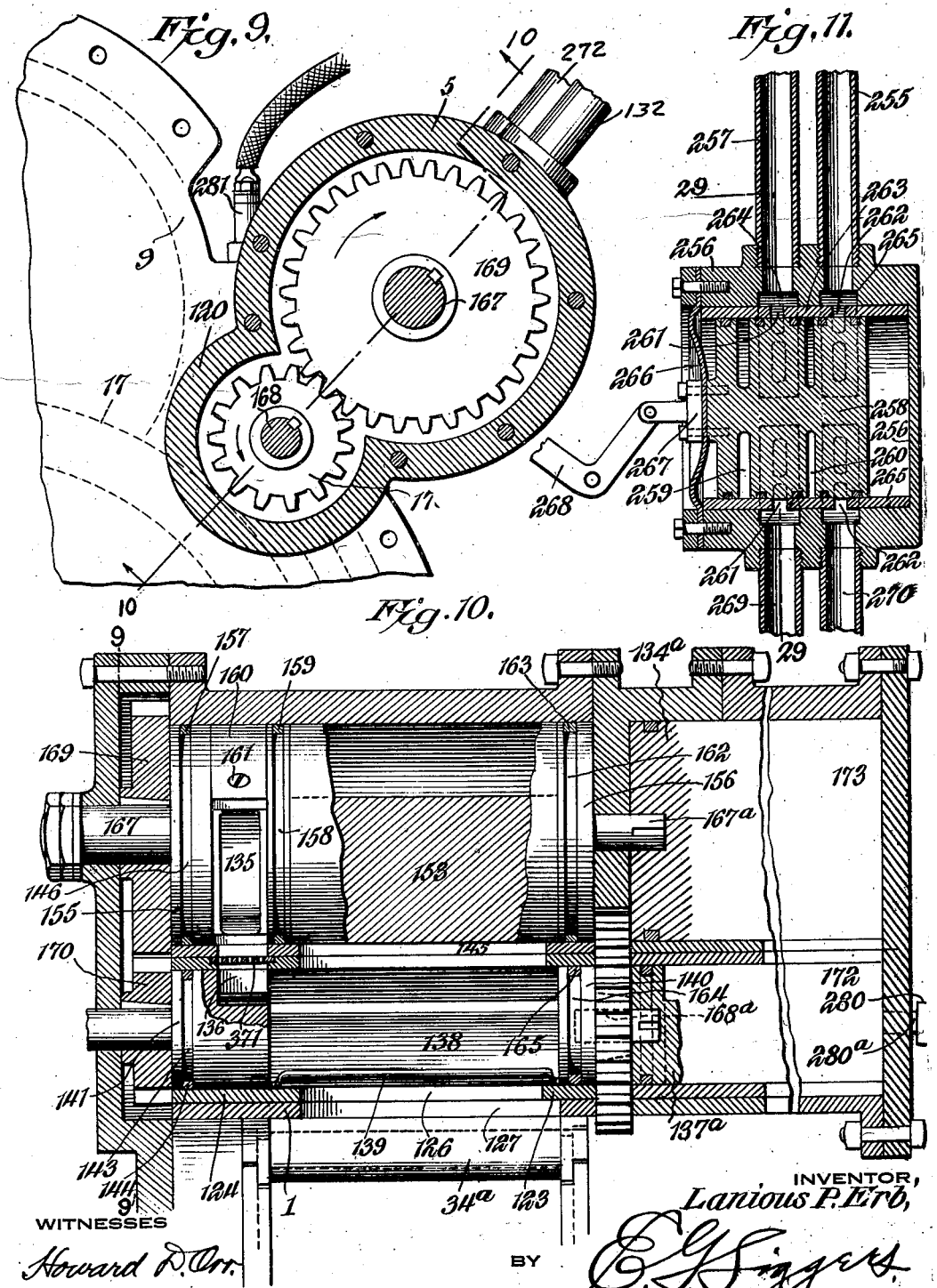

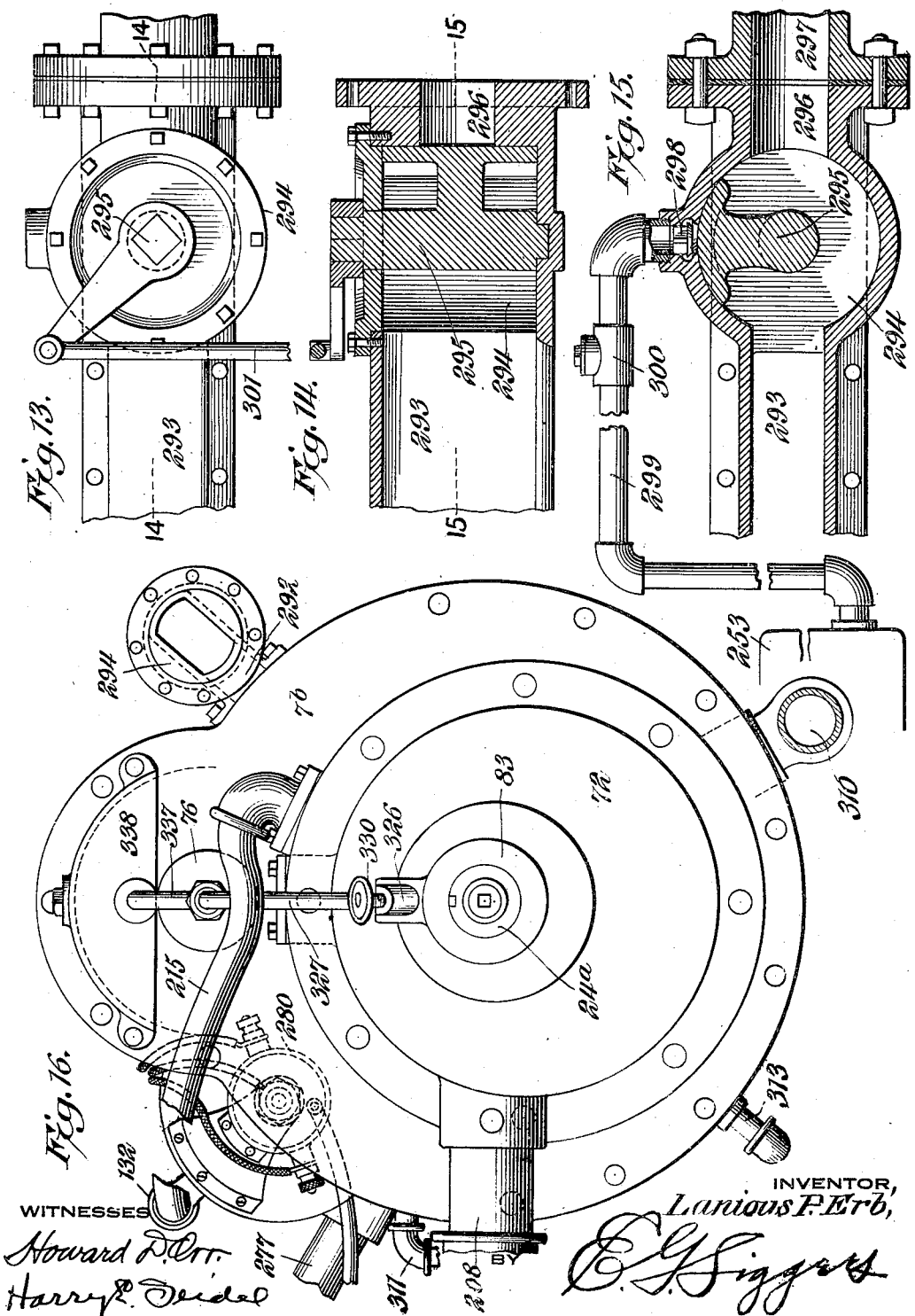

March 12, 1929.  L. P. ERB  1,705,359
ROTARY COMBUSTION ENGINE
Filed Oct. 14, 1922    17 Sheets-Sheet 8
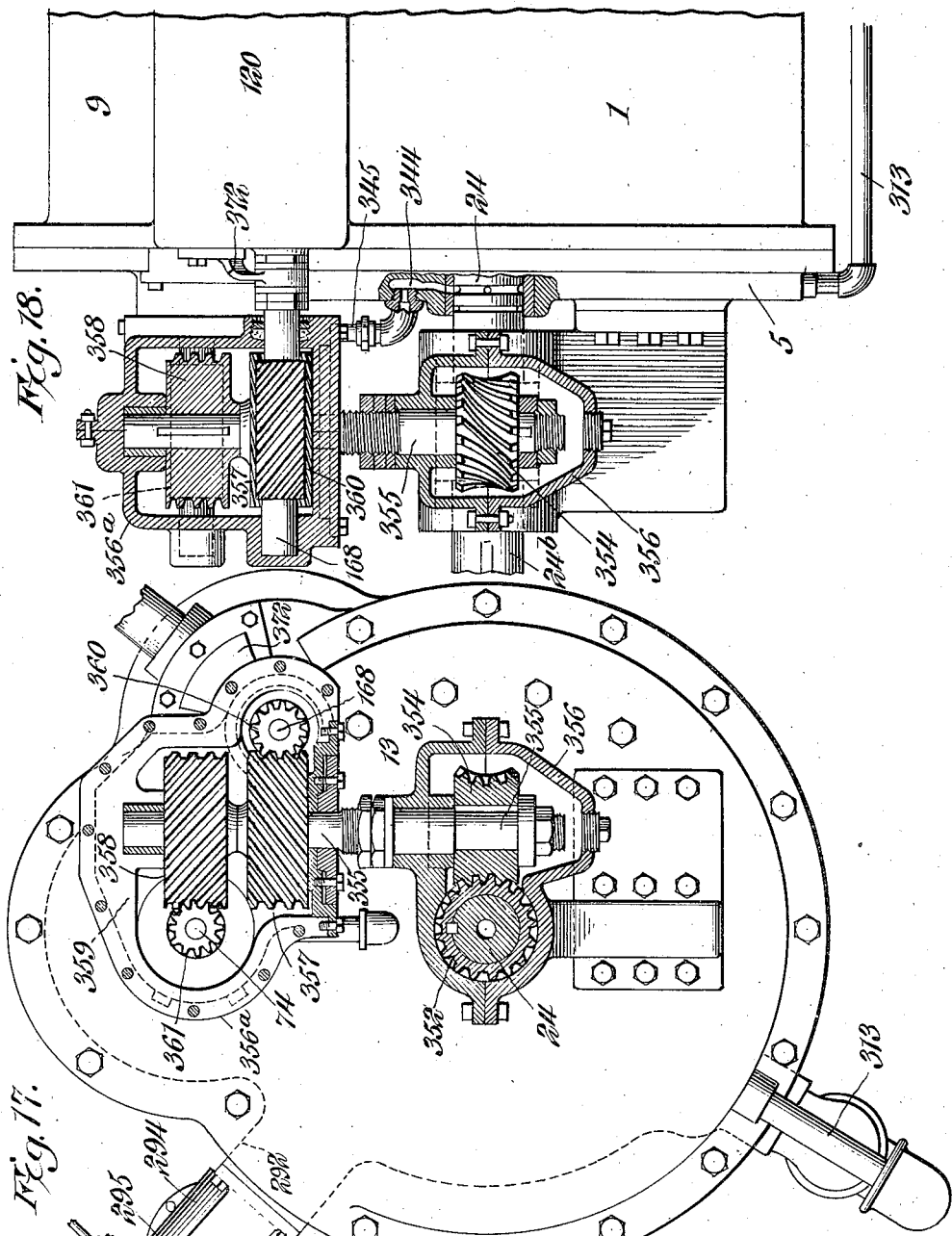

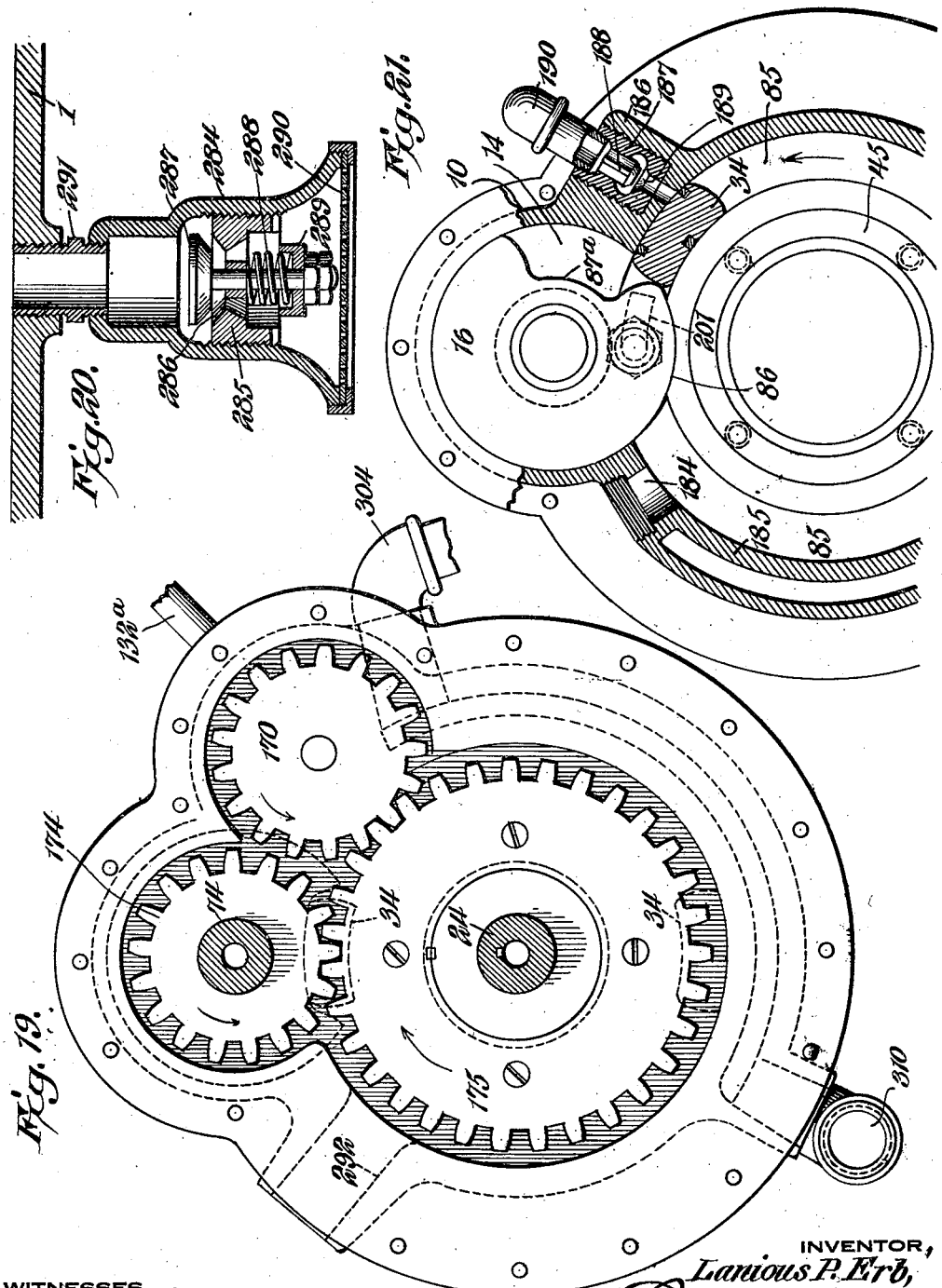

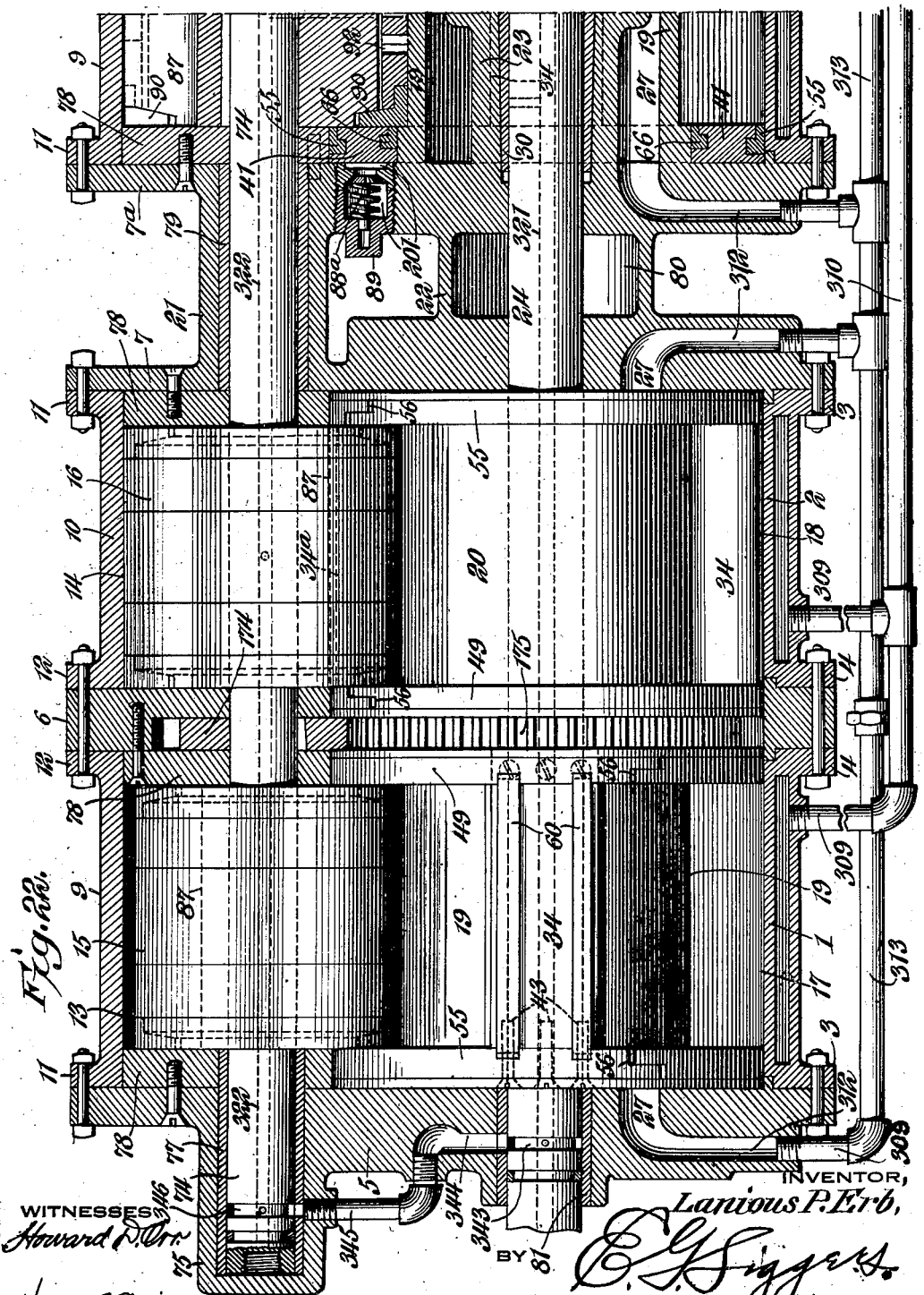

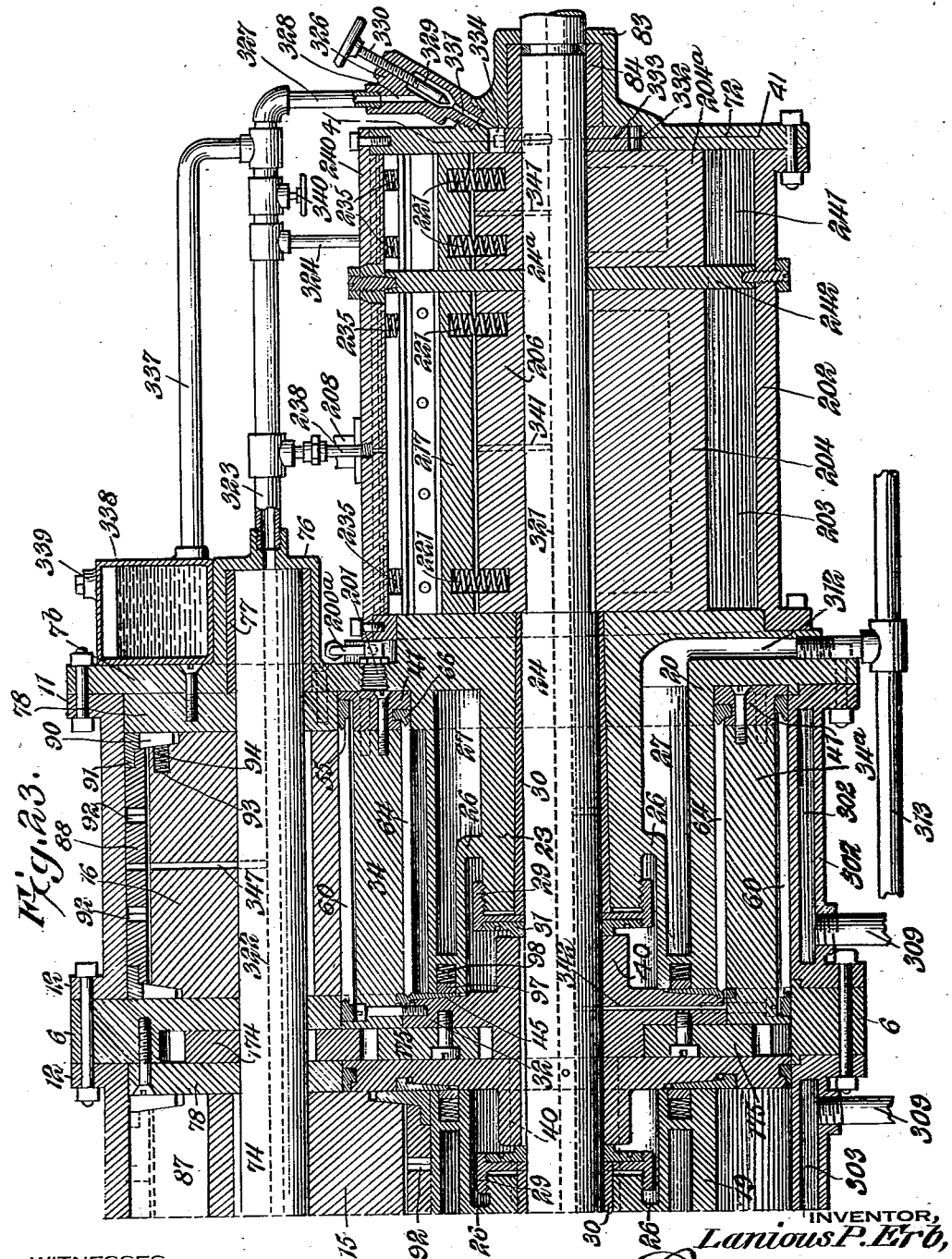

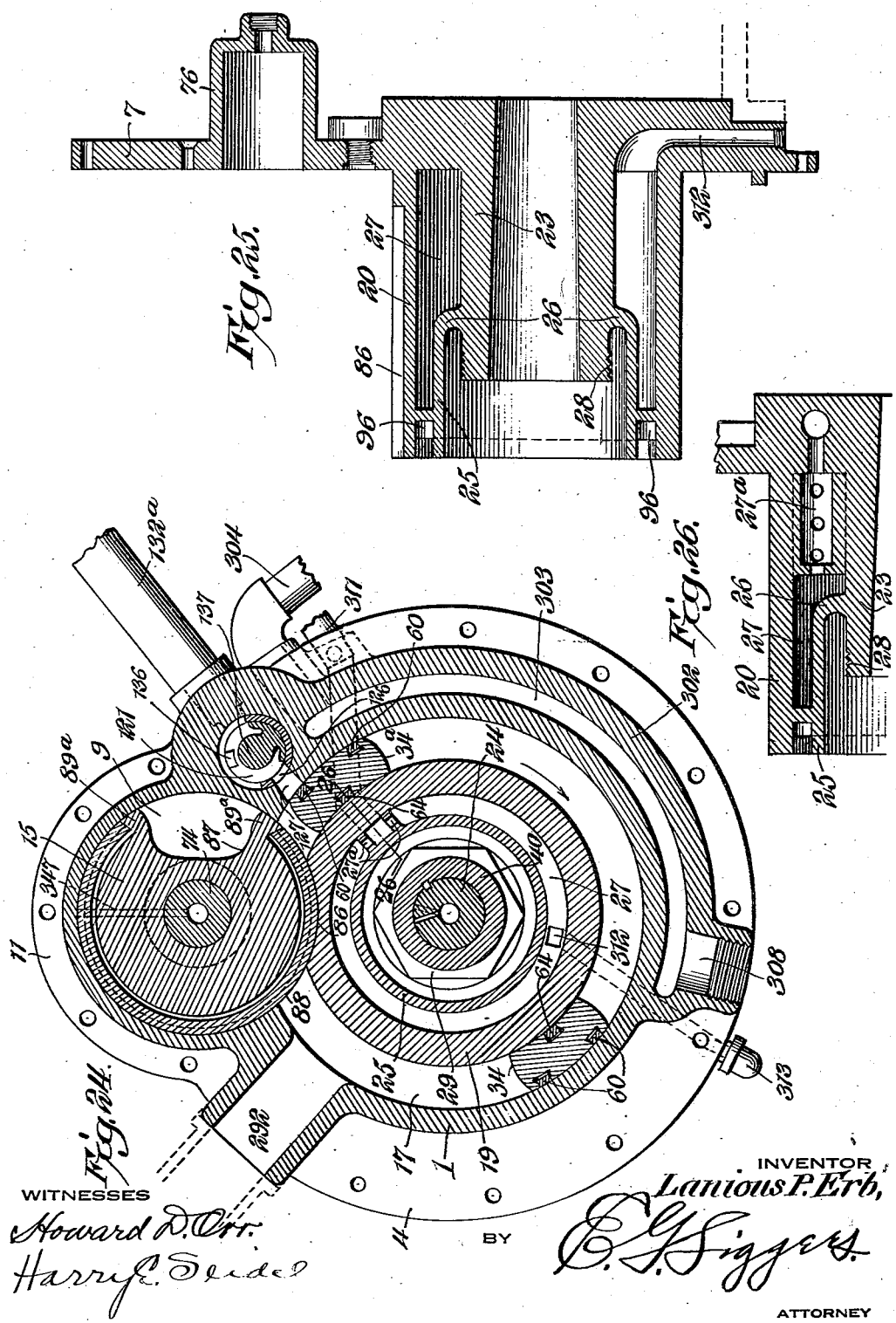

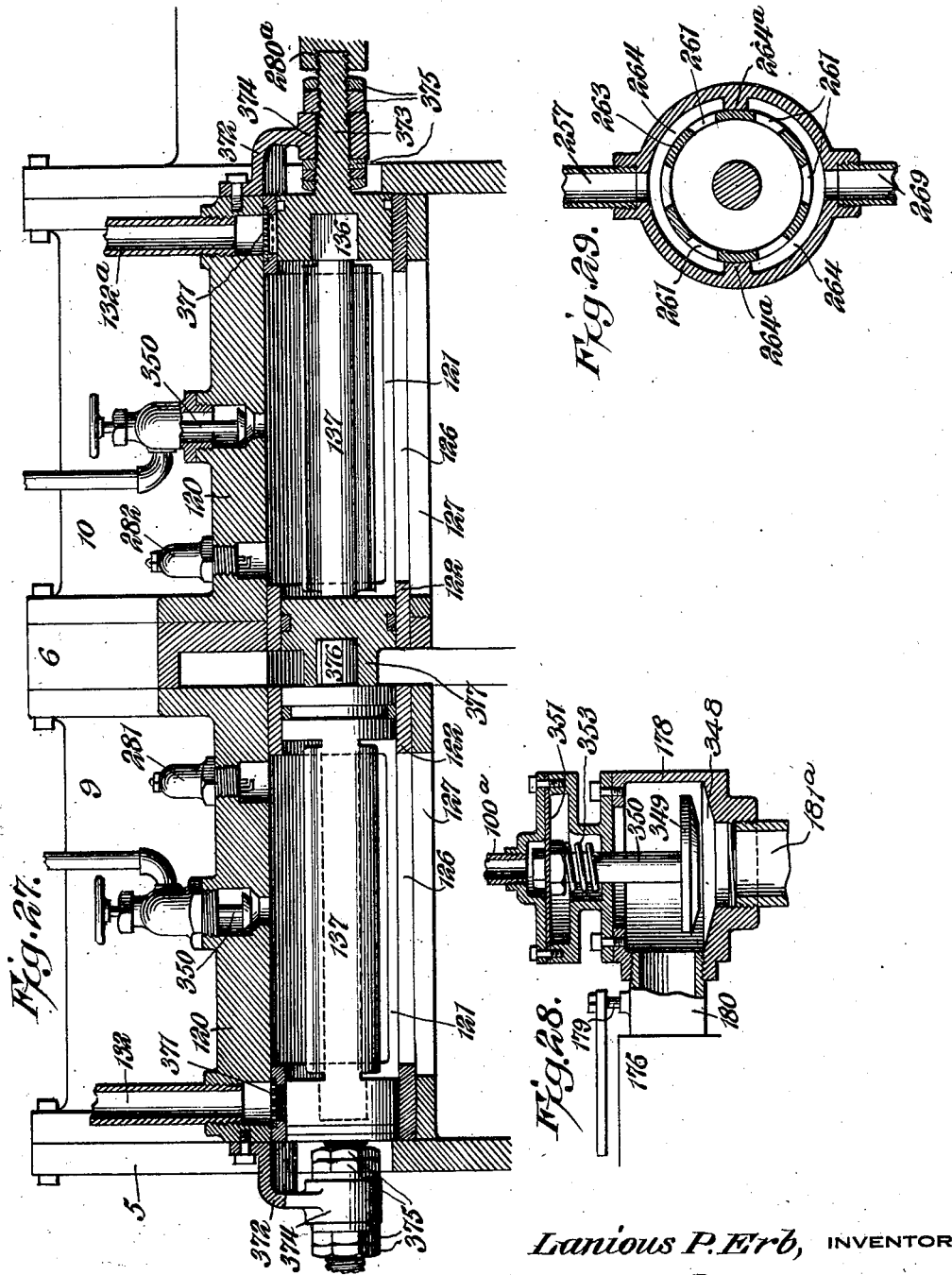

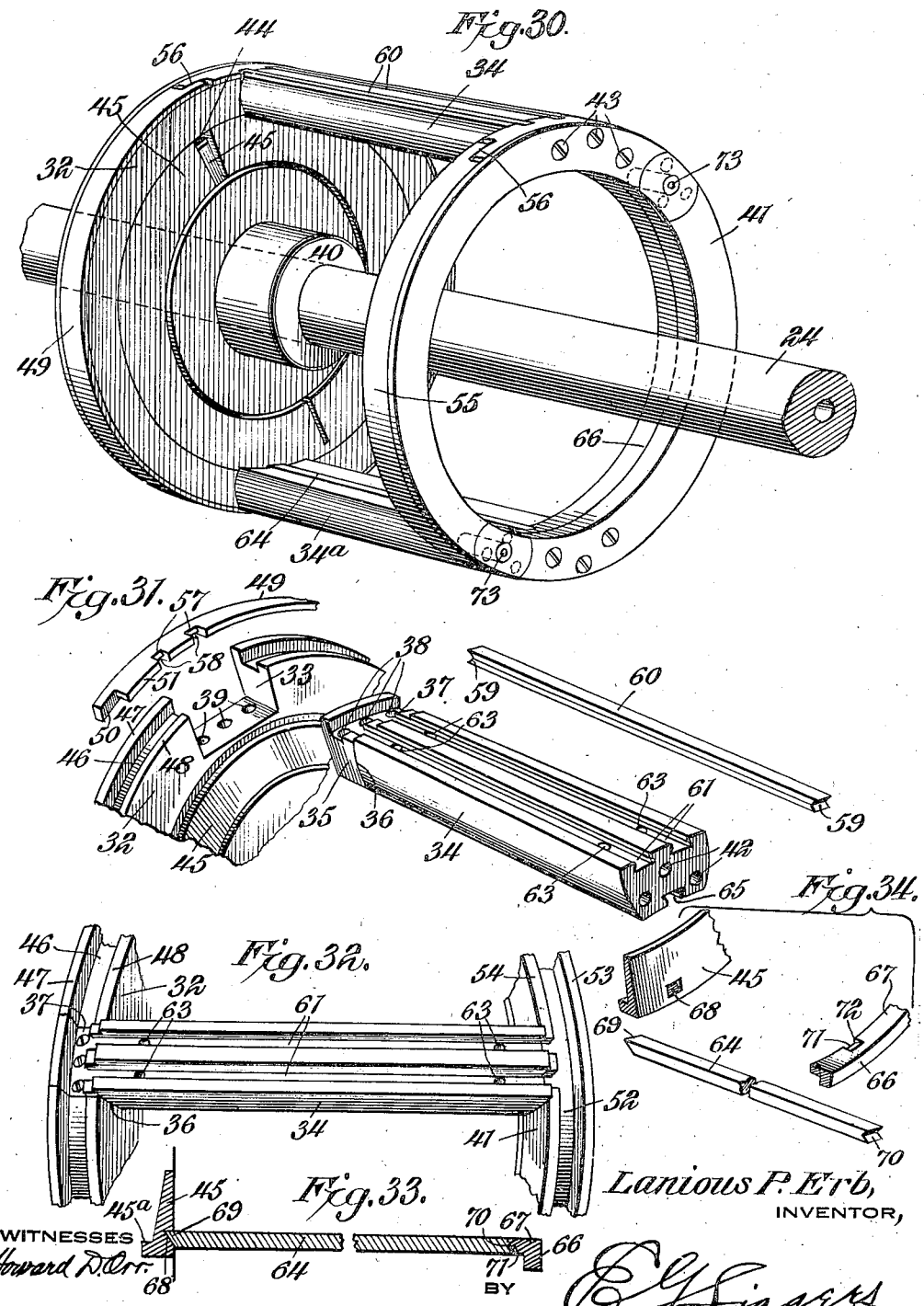

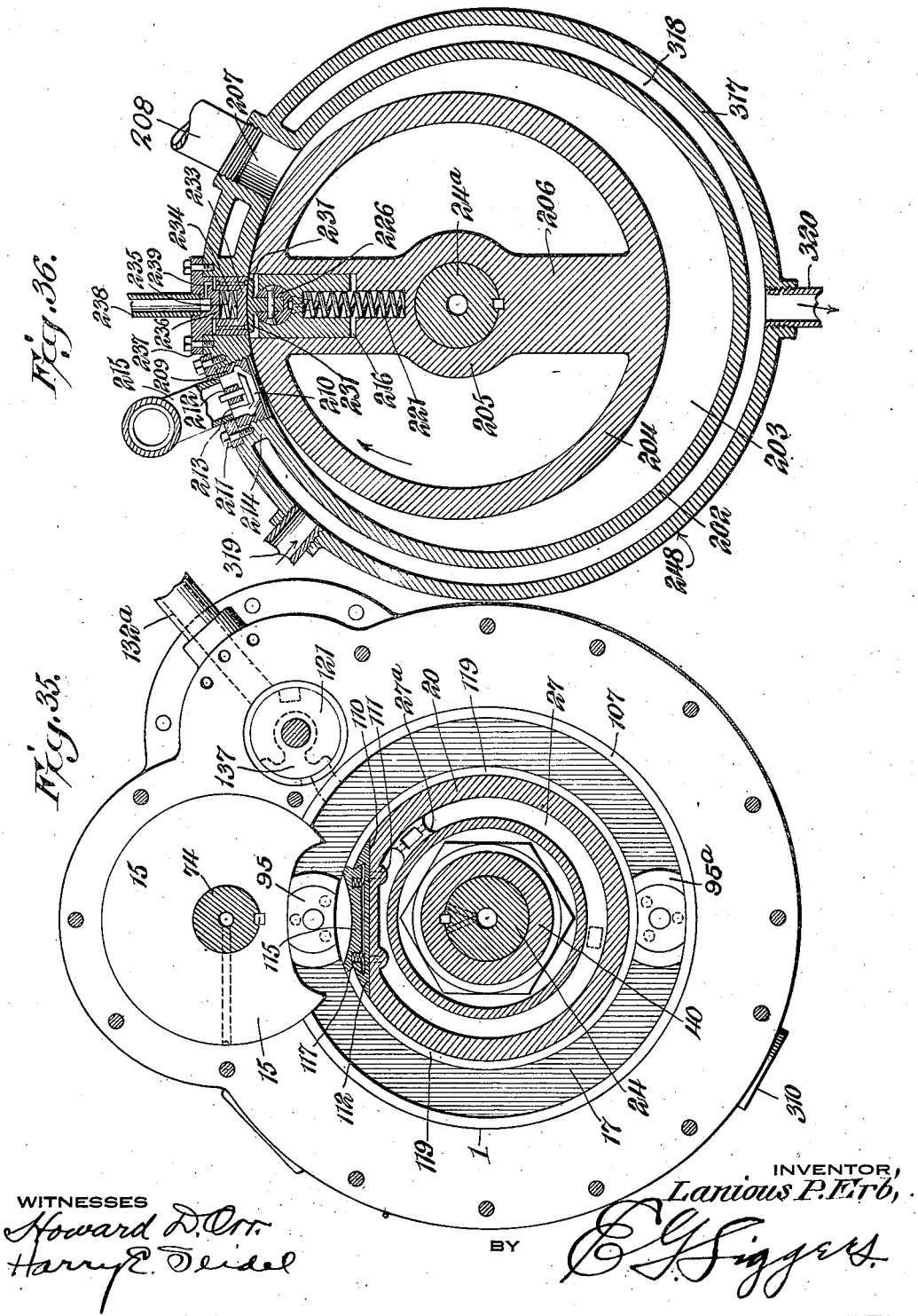

March 12, 1929.  L. P. ERB  1,705,359
ROTARY COMBUSTION ENGINE
Filed Oct. 14, 1922   17 Sheets-Sheet 16
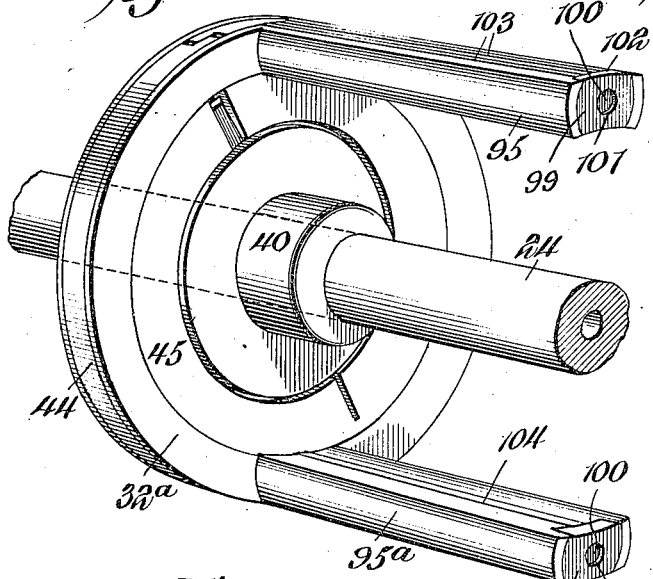
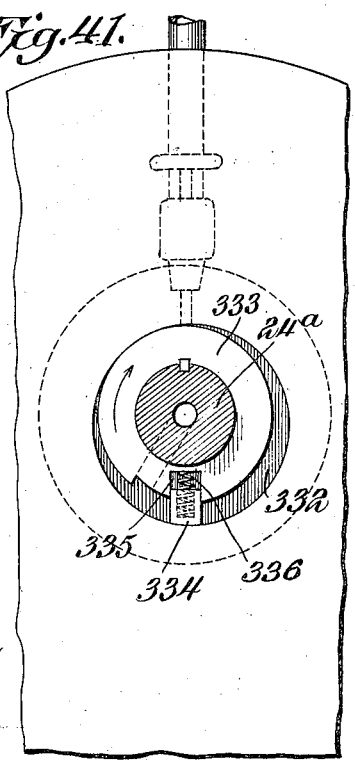
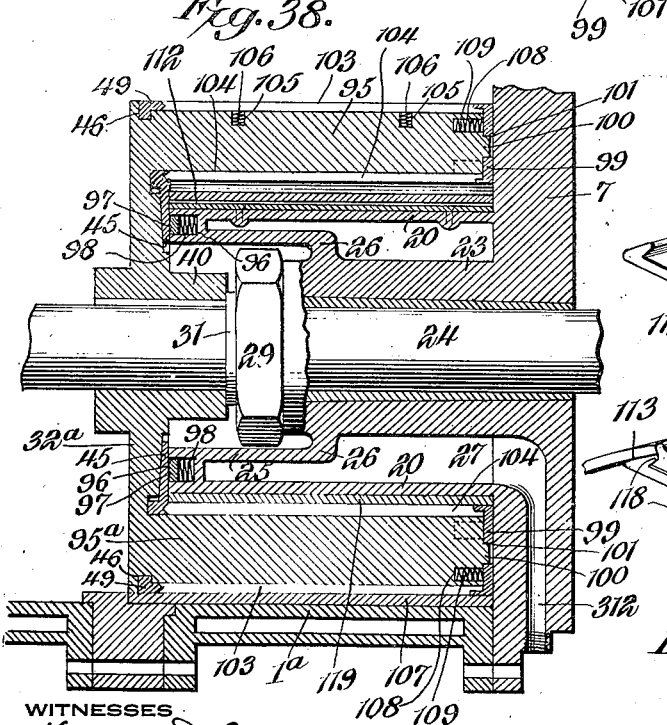
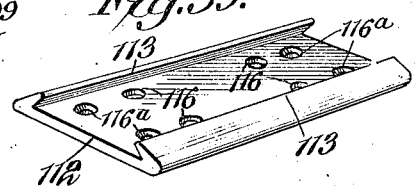
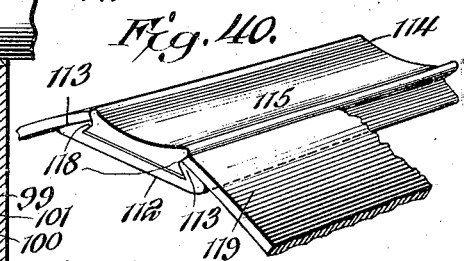
Lanious P. Erb,
INVENTOR,
ATTORNEY

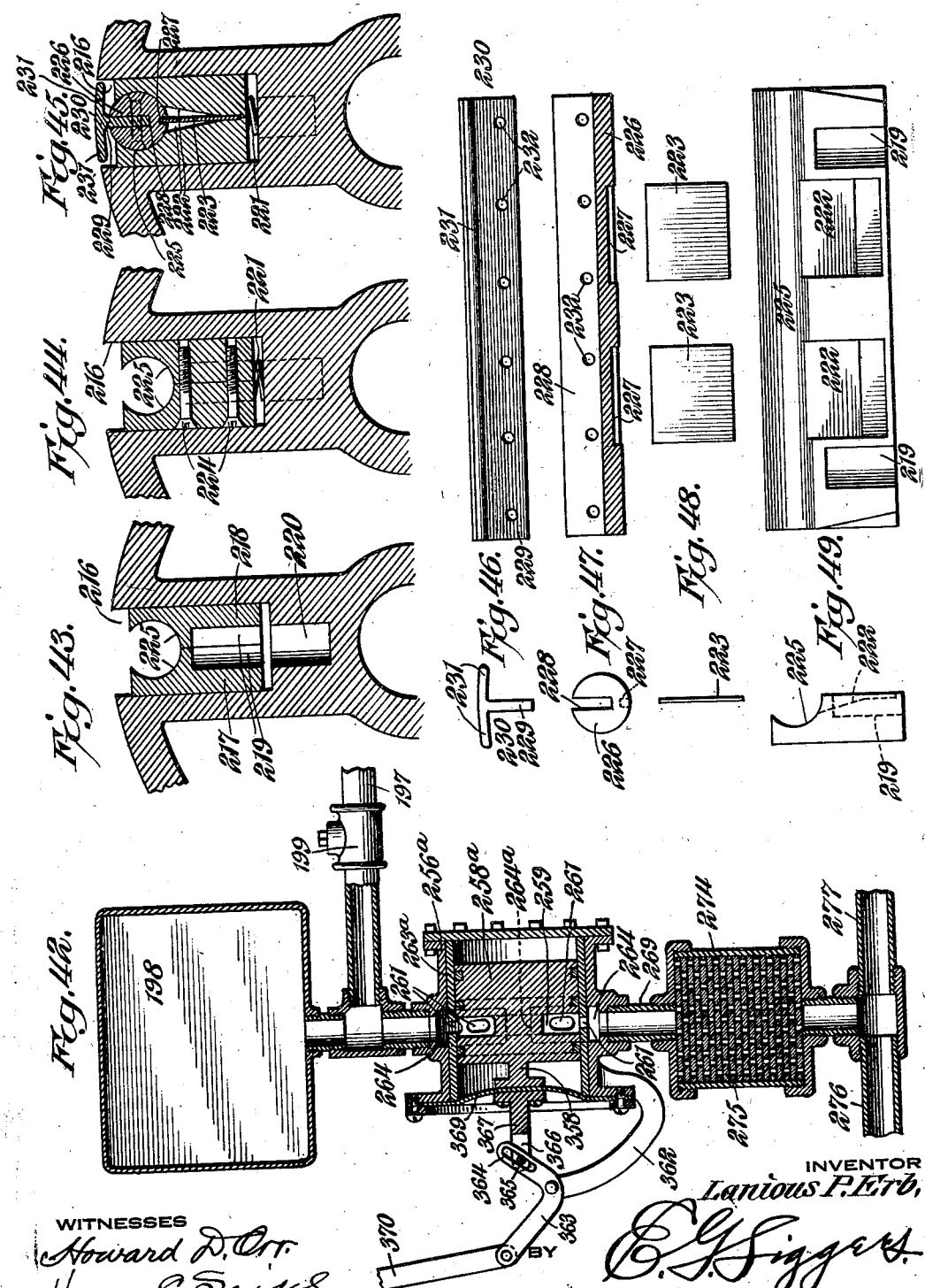

Patented Mar. 12, 1929.

1,705,359

UNITED STATES PATENT OFFICE.

LANIOUS P. ERB, OF ANACONDA, MONTANA, ASSIGNOR OF ONE-EIGHTH TO ERNEST KINDT, OF ANACONDA, MONTANA, AND ONE-EIGHTH TO DAN A. GRAHAM, OF ANACONDA, MONTANA.

ROTARY COMBUSTION ENGINE.

Application filed October 14, 1922. Serial No. 594,059.

This invention relates to rotary combustion engines, and has for its object to supply a combustion chamber, which is distinct from the motor cylinder with a combustible mixture compressed externally of the motor cylinder, with provision for maintaining the pressure of the combustible mixture constant.

Another object of the invention is the addition of an air compressor driven by the engine shaft for supplying the engine with compressed air in alternation with a compressed combustible mixture for effecting the power strokes of the pistons in the motor cylinder, the heat developed by a preceding explosion of the compressed combustible mixture being absorbed by the succeeding charge of compressed air admitted to the cylinder and converted into work by expanding the compressed air and thus effecting certain power strokes of the pistons.

A still further object of the invention is the provision of a plurality of valves cooperating to control in alteration a supply of a compressed combustible mixture and compressed air to the motor cylinder.

Another object of the invention is the provision of a rotary engine for an automobile operated by the alternate admission of ignited compressed combustible gas and compressed air, which may be converted into an air compressor when the automobile is going down grade with the running gear actuating the engine shaft, an automatic air valve admitting air to a cylinder of the motor when operated as an air compressor, but maintained closed by the spring pressure within the valve casing during the power strokes of the piston.

Another object of the invention is the provision of a rotary engine adapted to be converted into an air compressor when the automobile is running down grade whereby the motor may be used as a brake for controlling the speed of the automobile, means being employed in the delivery of the compressed air to a storage tank for regulating the speed of the automobile.

A further object of the invention is the provision of an exhaust pipe connected with the motor cylinder whereby when the motor is operated as an air compressor, the compressed air from the said cylinder may be conducted to a tank for storage with the exhaust pipe closed to the atmosphere.

The invention also contemplates the use of a unitary structure of helical gearing for operatively connecting the crank shaft with a rotary abutment forming the ends of an expansion chamber and with the valves which control the alternate admission of compressed air and combustible mixture to a combustion chamber external to the motor cylinder, and the exhaust of the fluids from the combustion chamber to the motor cylinder.

Another object of the invention is the provision of a rotary engine with a combustion chamber external to the motor cylinder, an expansion chamber within the cylinder for the ignited gases from the combustion chamber with a rotary abutment forming the end of the expansion chamber, and a plurality of pistons operating therein, whereby when the ignited expanding gases enter the explosion chamber between a piston and the rotary abutment and upon one side of the rotary abutment, the power strokes of the pistons are effected.

A still further object of the invention is the provision of a well balanced rotor structure for operating the engine shaft which takes up a minimum amount of space in the engine cylinder, and which is so completely equipped with packing that leakage between the rotor structure and its associated parts is prevented.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Fig. 1 is a side elevation of the forward end of the preferred form of the rotary combustion engine.

Fig. 1ª is a side elevation of the rear end of the rotary combustion engine and is a continuation of the portion shown in Fig. 1.

Fig. 2 is a side elevation of a modified form of the rotary combustion engine in which the use of compressed air is dispensed with.

Fig. 3 is a transverse vertical section taken along the line 3—3 of Fig. 1, portions of the valves being in section substantially on the line 7—7 of said figure.

Fig. 4 is a view in perspective of a liner for the combustion chamber of the engine shown in Fig. 1.

Fig. 5 is a view in perspective of a liner for the combustion chamber of either the preferred or the modified form of engine shown in Figs. 1 and 2.

Fig. 6 is a view in perspective of the valve for controlling the admission and exhaust ports of the combustion chamber.

Fig. 7 is a transverse vertical section taken along the line 7—7 of Fig. 1.

Fig. 8 is a transverse vertical section taken along the line 8—8 of Fig. 1.

Fig. 9 is a transverse section taken along the line 9—9 of Fig. 10.

Fig. 10 is a longitudinal section taken along the line 10—10 of Figs. 3, 7, 8 and 9.

Fig. 11 is a longitudinal section through the manually-operated valve which controls the admission of compressed air and compressed combustible fluid to the combustion chamber of the engine shown in Fig. 1.

Fig. 12 is an end view of the same.

Fig. 13 is a plan view of the exhaust pipe and the choke valve for diverting the compressed air formed at certain times within the motor cylinder to a storage tank.

Fig. 14 is a vertical cross section taken along the line 14—14 of Fig. 13.

Fig. 15 is a vertical section taken along the line 15—15 of Fig. 14.

Fig. 16 is a rear end elevation of a modified form of engine disclosed in Fig. 2.

Fig. 17 is a front end elevation of the engine disclosed in Fig. 2, showing the timing gears partly in section.

Fig. 18 is a side elevation of the timing gears partly in section.

Fig. 19 is a transverse vertical section showing a modified form of timing gearing shown in Fig. 22.

Fig. 20 is a transverse vertical section of the automatic air valve for admitting air to the motor of the preferred form of the motor unit shown in Fig. 1, when said engine is operating as an air compressor.

Fig. 21 is a transverse vertical section of the low pressure compressor for compressing the combustible gas taken on the line 21—21 of Fig. 1.

Fig. 22 is a vertical longitudinal section of the forward end of the modified form of the engine shown in Fig. 2 but which embodies a different form of timing gearing, as shown in Fig. 19.

Fig. 23 is a longitudinal vertical section of the modified form of engine showing sections of the low pressure compressors and the high pressure compressor for the combustible gas and a low compressor for incombustible gas the same being a continuation of Fig. 22.

Fig. 24 is a transverse vertical section of the modified form of engine taken along the line 24—24 of Fig. 2.

Fig. 25 is a vertical section showing a detail of a drum concentrically mounted within the engine casing of any of the forms illustrated.

Fig. 26 is a longitudinal section taken on line 26—26 of Fig. 24 showing a detail of the nozzle for admitting water to an internal water jacket within the drum.

Fig. 27 is a longitudinal section of the external combustion chamber of the modified form of engine shown in Fig. 2.

Fig. 28 is a vertical section of the valve used with all forms for controlling the air to the carbureter.

Fig. 29 is a transverse vertical section of a manually operated valve for controlling the supply of compressed combustible fluid taken on line 29—29 of Fig. 42 and may also be considered as being substantially a section on line 29—29 of Fig. 11.

Fig. 30 is a view in perspective of the rotor for either the motor or low pressure compressor units in either the preferred or modified forms of the rotary combustion engine.

Fig. 31 is a view in perspective of the detail parts of the portion of a rotor separate from each other.

Fig. 32 is a view in perspective showing a detail of the piston blade with portions of its associated parts.

Fig. 33 is a section of the piston blade showing in detail the connection between certain members of the packing for the piston blades.

Fig. 34 is a view in perspective disclosing details of certain members of the packing for the rotor.

Fig. 35 is a transverse vertical section of a modified form of the rotor structure shown in Fig. 38.

Fig. 36 is a transverse vertical section of the high compressor for combustible mixture and which also serves to illustrate the construction of a non-inflammable gas compressor.

Fig. 37 is a view in perspective of a modified form of rotor shown in Figs. 35 and 37.

Fig. 38 is a view in longitudinal section of the modified form of the rotary combustion engine shown in Figs. 35 and 37 adapted to be used with the modified form of rotor shown in Fig. 37.

Figs. 39 and 40 show a modified form of packing shown in assembly in Fig. 35.

Fig. 41 is a vertical section of an oil pump for forcing lubricant to various moving parts of the engine taken on line 41—41 of Fig. 23.

Fig. 42 is a transverse vertical section of the manually-operated control valve used in the modified form of engine disclosed in Figs. 2, 22 and 23 with certain of its associated parts.

Fig. 43 is an enlarged detail of the piston blade for the high compressor shown in Fig. 36, parts being omitted.

Fig. 44 is another transverse section of the same.

Fig. 45 is a transverse section of the piston blade disclosing the means for retaining the packing in a radial position.

Fig. 46 discloses an end and side elevation of details of the T-shaped packing strip.

Fig. 47 discloses end and longitudinal sectional views of the rock shaft which supports the T-shaped packing.

Fig. 48 represents end and side views of the springs for retaining the T-shaped packing in a normal radial position.

Fig. 49 represents end and side views of one member of the movable piston blade.

The preferred form of the rotary combustion engine, shown in side elevation in Figs. 1 and 1ª, comprises a pair of motors, the pistons of each rotor being driven in alternation from a source of compressed combustible mixture and a source of compressed air, with the power stroke of a piston in one rotor chamber being effected by the expansion of the ignited compressed combustible mixture, while the power stroke of a similar piston in the other rotor chamber is simultaneously effected by the expansion of the compressed air due to the absorption of heat by the compressed air in the chamber in which the piston of that rotor operates.

Storage tanks are located between the motors and the source of compressed combustible fluid.

The combustible mixture is drawn into a low pressure compressor from the carbureter and compressed, and is either delivered directly to its respective storage tank or to a high pressure compressor when the pressure of the combustible mixture in the low pressure compressor has not reached a predetermined pressure, the diversion of the compressed combustible mixture from the storage tank to the high pressure compressor being automatic and regulated by the pressure in the low pressure compressor.

The air compressor is mounted in alinement with the combustible mixture compressor and supplies compressed air to the storage tank. The supply of atmospheric air to the air compressor is automatically regulated by the pressure in the exhaust pipe of the air compressor. An additional compressor is mounted in alinement with the other compressors for compressing a non-inflammable gas. This compressed gas is injected into the water cooling system for promoting the circulation of the cooling medium in the system. At the extreme end of the unit is mounted an oil pump for feeding lubricant to the moving parts of the whole unit.

The low pressure compressors, the high pressure compressor, the air compressor, the non-inflammable gas compressor and the oil pump are all driven by the drive shaft of the engine, with a necessary complement of gearing for operating the valves which control the flow of compressed combustible mixture and compressed air to the pair of motors. Means are also employed for shutting off the flow of compressed combustible mixture and compressed air to the motors, with means connecting the exhaust pipe of the motors to the compressed air storage tank, and means for admitting atmospheric air to the motors, whereby the motors are converted into air compressors for delivering compressed air to the air storage tank and for braking the engine when the automobile on which the engine is mounted is traveling down grade and the running gear of the auotmobile is operatively connected with the engine shaft.

Referring to Figs. 1, 3, 7 and 8, 1 and 2 represent respectively the outer cylindrical casings of the rotors provided with laterally-extending peripheral flanges 3 and 4, with the flange 3 of the casing 1 secured by means of bolts to a head 5, and with the flanges 4 of both casings secured to a filler block 6, which serves the purpose of spacing the motors from each other. The flange 3 of casing 2 is secured to a head 7 of the second motor. Brackets 8 projecting laterally outwardly from opposite sides of the casings 1 and 2, and adjacent the bottom of said casing, provide means for mounting the motors on the chassis of an automobile.

Cast integrally at the top of the casings 1 and 2, but of smaller diameter than the said casings, are casings 9 and 10 with laterally projecting flanges 11, adapted to be secured to the respective heads 5 and 7, with flanges 12 adapted to be secured to the filler block 6. These casings extend longitudinally of the casings 1 and 2 and provide chambers 13 and 14 for the mounting of the respective rotary abutments 15 and 16.

The chambers 13 and 14, at their lower ends, open into the respective expansion chambers 17 and 18 formed by the inner walls of the cylindrical casings 1 and 2, with drums 19 and 20 mounted concentrically within the casings and cast integrally with the respective heads 5 and 7, which form the ends or cylinder heads of the rotary combustion engine, as shown more particularly in Figs. 22, 23 and 25. While these figures disclose a construction of the low pressure compressors, nevertheless the structures of the motors and the low pressure compressors are identical with the exception of slight necessary changes, and therefore a description of one will suffice for a description of the other. Furthermore, it must be borne in mind that while Figs. 22 to 25 disclose a modification of the construction shown in Figs. 1 and 1ª, and in which the features of the alternate supply of compressed combustible mixture and compressed air is omitted, the internal structure of these motors is identical with the structure of the motors of the preferred form.

Referring more particularly to Figs. 22 and 23, relating specifically to compressors but in which to a certain extent the same reference characters used in connection with the motor units are employed, it will be seen that the ends of the low pressure compressors are provided with heads 7ª and 7ᵇ. The head 7ª is connected to the head 7 of the rotary engine by means of cylindrical webs 21 and 22. Other functions of the webs will be presently explained. The opposite ends of the casings of the rotary abutment chambers have flanges 11 and 12 connected respectively to the heads 7ª and 7ᵇ and to the filler block 6.

Referring to Figs. 3, 21, 22, 23, 24 and 25, it will be seen that bosses 23 formed integrally with the heads and located concentrically with the drums 19 and 20 provide bearings for a crank shaft 24.

Concentric with the drum 20 and boss 23 is a tubular member 25 having its inner peripheral edge connected at 26 to the outer wall of the boss 23 and intermediate the ends of said boss. The member 25, in cooperation with the drum 20 and the boss 23, forms a water jacket or cooling chamber 27.

The inner free end of the boss 23 is threaded at 28 to receive a thrust nut 29. The nut is adapted to maintain a cone-shaped bushing 30 in position on the shaft 24 and within the hollow boss 23. The longitudinal passage within the hollow boss is tapered coincidently with the tapering of the bushing 30, whereby the bushing will snugly fit said passage. The outer end of the nut 29 is recessed to receive an oppositely adjusting nut threaded to engage the boss 40 as the bushing 30 wears it is pushed up by nut 29 to prevent side play of shaft 24.

Keyed to the shaft 24, and within the several cylindrical casings forming the outer shells of the expansion chambers of the rotary combustion engine and the compression chambers of the low pressure compressors for combustible mixture, are rotors which are shown in greater detail in Figs. 30 to 34, inclusive. Each rotor comprises a disk 32 having diametrically-disposed sockets 33 to receive the ends of the rotary piston blades 34 and 34ª, with the blades cut away at this end, as shown at 35, to form a shoulder 36 which abuts the inner face of the disk 32. The piston blades adjacent this end are grooved at 37, with passages 38 opening into the slot 37 and disposed radially and in alinement with the passages 39 in the sockets of the disk 32, for receiving a fastening means by which the ends of the piston blades are secured in the sockets 33 of the disk 32.

Concentric with the shaft 24 is a boss 40 integrally formed with and projecting from the inner face of the disk 32, with the inner end of said boss in engagement with the adjusting nut 31. The disk 32 through said boss is keyed to the shaft.

Spaced from the disk 32 and concentric with the shaft 24 is a ring 41, which is secured to the opposite ends of the piston blades 34 and 34ª, with the ends of the blades abutting the inner face of said ring. The ends of the piston blades where connected to the ring 41 are provided with internally threaded passages 42 in alinement with passages in the ring 41, for the reception of screws 43 for securing the ring to the ends of the blades.

On the inner face of the disk 32 is formed an annular groove 44 with an inclined bottom for the reception of an annular split packing ring 45, the inner face of the packing ring being tapered in correspondence with the inclination of the bottom of the groove. The packing ring 45 has a laterally projecting annular flange 45ª seated within an annular groove located below the groove 44 in the disk 32.

Formed in the periphery of the disk 32 is an annular groove 46, with the outer wall 47 of greater height than the inner wall 48. The groove 46 is adapted to receive a split packing ring 49 which, in cross section, is in the shape of an inverted L, with the portion 50 seated within the groove 46 and the laterally-extending flange 51 resting on the peripheral edge of the wall 48, the height of the flange 50 being equal to the height of the walls 47, whereby the outer face of the flange 51 will be flush with the peripheral edge of the wall 47.

The ring 41 is provided with a groove 52 in its outer periphery, with the wall 53 of greater height than the wall 54, so that when the packing ring 55, which is similar in construction to the packing ring 49, is seated within the groove 52, the laterally-extending flange 56 will be seated on the periphery of the wall 54 with its outer surface flush with the periphery of the wall 53.

The packing rings 49 and 55, adjacent the ends of the piston blade 34, are provided with notches 57 in which are formed V-shaped lugs 58 adapted to be received by V-shaped notches 59 of packing strips 60. These packing strips are mounted in longitudinal grooves 61 in the outer face of each piston blade. These grooves are undercut at their bottoms (see Fig. 31), and the side walls are engaged by similar inclined portions of the packing strips 60 to prevent loss of the strips from the grooves.

Springs 62 seated in sockets 63 formed in the grooves 61 press outwardly on the strips for maintaining the outer faces of the strips in engagement with the inner wall of the casings 1 and 2. Packing strips 64, mounted in undercut grooves 65, engage the outer wall of the drums and prevent leakage of fluid between the drums and the piston blades 34ᵃ and 34. The packing strips 64 are held in place not only by means of the inclined side walls of the strips engaging the undercut side walls of the grooves 65, but by reason of the engagement of the ends of said strips with the packing ring 45 and a packing ring 66, which is L-shaped in cross section, and which is seated in a groove formed in the inner periphery of the ring 41. The flanged portion 67 of the packing ring 66 engages the drums. The packing ring 45 is provided with a V-shaped notch 68 in which the beveled end 69 of the packing strip 64 is seated, while the other end of the strip is provided with a V-shaped notch 70 adapted to be engaged by a V-shaped lug 71 located in a notch 72 of the flanged portion 67 of the packing ring 66. The notches 68 of the ring 45, and the notches 72 of the ring 66, are located at diametrically opposite points on the respective rings.

Formed at diametrically opposite points, and adjacent the ends of the blades 34 and 34ᵃ, are horizontal air passages 73 extending through the ring 41. These passages are for a purpose which will be presently explained, and are only found in the rotor structure of the pair of combustion engines and the low pressure compressors of the preferred form of the invention, while in the modified form shown in Fig. 2, these air passages are only employed in the rotor structures of the low pressure compressors for compressing a combustible mixture.

The construction of the rotary abutment is shown more particularly in Figs. 3, 21, 22, 23 and 24. The abutments 15 and 16 are mounted on a single shaft 74 and driven at twice the speed of the main shaft 24 through appropriate gearing connected with shaft 24. The shaft 74 is mounted in bearings 75 and 76, which are formed as bosses projecting respectively from the heads 5 and 7ᵇ. Bushings 77 are located within these hollow bosses.

Auxiliary filler blocks 78 abut the ends of the rotary abutment, and are secured either to the cylinder heads of the engines or the low compressors, or to the filler blocks 6 in any approved manner. As shown particularly in Fig. 22, the lower ends of the filler blocks are cut away on the arc of a circle, the diameter of which is substantially equal to the diameter of the disks 32 and the rings 41, so that as the disks and rings are propelled by means of the piston blades 34 and 34ᵃ, the respective rings 49 and 55 will have their peripheries in engagement with the cut-out circular portions of the filler blocks 78 and prevent leakage of fluid, whether compressed air or compressed combustible fluid is present at these points. The filler blocks 6 likewise have their lower ends cut away upon the same arc and are adapted to be engaged by the adjacent rings on the rotor structure. Passages are likewise formed in the filler blocks 6 and 78 to permit the passage of the shaft 74 which extends longitudinally of the engine and the low compressors. The thickness of the respective filler blocks are equal to the thickness of the rings 41 or disks 32, as the case may be, so that the revolving rotary abutments will have their end faces in engagement with the inner faces of the rings and disks, with the abutments revolving between the revolving disks and rings.

The shaft likewise extends longitudinally through the cylindrical web 21 connecting the heads 7 and 7ᵃ, as shown in Fig. 22, the web being provided with a bushing 79.

The drive shaft 24 passes through the web 22 in which is formed an oil chamber 80. The bearing for the shaft 24 in the head 5 is supplied with a bushing 81, while the head 72 on the rear end of the unit, whether preferred or modified form, is provided with an integrally formed boss 83 with a bushing 84 in said boss and on the reduced end 24ᵃ of the main shaft 24.

Each abutment is cylindrical in form, of less length than the rotor structure, and projects within the expansion chamber 17 of the engine or compression chambers 85, Fig. 21, of the low pressure compressors.

The stationary drums 19 and 20 are provided with a longitudinal groove 86 (Figs. 3, 21 and 24) which is concaved on an arc of a circle, the radius of which is substantially the radius of the cylindrical rotary abutment, so that the outer wall of the rotary abutment will revolve in this groove, thereby dividing the expansion chamber of the engine and likewise the compression chambers of the low pressure compressor, with the rotary abutment forming the opposite ends of said chambers. A longitudinal groove or pocket 87 is formed in the wall of the rotary abutment, into which the piston blades 34 are adapted to seat for permitting the piston blades to pass between the rotary abutment and the drum 19. The pocket 87ᵃ of the compressor shown in Fig. 21, is adapted to cooperate with the blades 34 for compressing a charge of combustible mixture which has been pocketed by this groove at the end of the compression stroke by the compressor, the compressed mixture in this instance escaping through the passage 73 of the ring 41 shown in Fig. 30, past a check valve 88ᵃ formed in a boss 89 in the head 7ᵃ, as shown in Fig. 22. A conduit 200 as best shown in Fig. 2 is connected with this boss for conducting this compressed charge of combustible mixture to a storage tank.

Encircling the rotary abutment and extending substantially the length of the rotary abutment is a packing ring 88. The outer wall of the abutment is recessed about its periphery, with the exception of the portions 89ª which are adjacent the pocket 87, the beveled edges of the ends of the ring engaging the inclined inner faces of the portions 89ª to aid in maintaining the ring in position on the rotary abutment. Mounted on the ends of the rotary abutment and adapted to engage the filler blocks 6 and 78 and the inner faces of the rings 41 and disks 32 of the rotor structure, are packing rings 90 having a laterally projecting flange 91 seated within the recessed peripheral edges of the packing ring 88. A dowel pin engaging a perforation in the ring 90 prevents rotation of said rings relative to the rotary abutments.

Ports 92 are formed in the packing ring 88 to permit fluid under pressure to enter the space between the packing ring and the outer cylindrical wall of the rotary abutment, for maintaining the packing ring pressed against the inner wall of the rotary abutment casing and the concaved groove 86 in the drums 19 and 20.

Pockets 93 bored inwardly of the ends of the rotary abutments are adapted to receive springs 94 which engage the packing rings 90 for maintaining them in engagement with the respective filler blocks 6 and 78.

Referring to Figs. 35, 37, 38, 39 and 40, a modified form of rotor and drum is shown.

Piston blades 95 and 95ª are formed integrally with the rotatable disk 32ª adjacent its periphery, with the blades projecting laterally from the inner face of said disk and at diametrically opposite points on the same. The disk is splined to the shaft, through the boss 40. The disk 32ª is similarly supplied with packing rings 45 and 49. The end of the water jacket, which is formed by bridging the inner wall of the drum 20 with the cylindrical member 25, is provided with an annular groove 96 in which is seated a packing ring 97 adapted to be forced outwardly and in engagement with the ring 45 by springs 98. Reference to Fig. 23 will disclose a similar construction of the packing ring 97 forced into engagement with the packing ring 45 of the rotatable disk 32.

The ring 41, in this modified construction, is absent, although it is necessary to supply the free ends of the piston blades 95 with a packing 99. The ends of the piston blades 95 are recessed to receive the packing 99 with an outwardly-projecting lug 100ª formed in the ends of the blades adapted to engage a perforation 101 in the packing 99. The upper and lower faces of the blades 95 are recessed adjacent their ends to receive the inturned ends 102 of the packing.

Packing strips 103 similar to the packing strips of the preferred form are located in longitudinal grooves in the outer faces of the piston blades 95 and 95ª, with one end engaging recesses and lugs in packings adjacent the ends of the strips similar to the construction shown in Figs. 30 to 34, inclusive. The packing strips 104 are mounted in longitudinal grooves in the inner faces of the piston blades 95 and 95ª in a manner similar to the mounting of the packing strips 103.

As shown in Fig. 38, pockets 105 are formed in the faces of the piston blades adapted to receive a spring 106 for forcing the packing strips 103 into engagement with a split packing ring 107 which covers substantially the inner wall of the cylinder casing 1ª. The upper ends of the split packing 107 terminate adjacent the walls of the rotary abutment chamber.

In the ends of the piston blades 95 are formed pockets 108 in which are seated springs 109 for forcing the packing strip 99 into engagement with the cylinder head 7 in order to prevent leakage of the fluid under pressure past this point.

As shown more particularly in Fig. 35, a segment of the uppermost portion of the drum 20 is sheared away as indicated at 110. Internally threaded perforated bosses 111 project inwardly of this portion of the drum and receive screws for securing a base plate 112 to the sheared-off portion 110 of the drum 20.

The plate 112 (Figs. 39 and 40) is provided with a dovetail groove with the inwardly-projecting walls 113 adapted to receive a packing strip 114 provided with a longitudinal concaved groove 115, in which the abutment 15 is adapted to seat when rotating. Pockets 116 are formed in the plate 112 adapted to receive springs 117 for forcing the packing strip 114 against the outer wall of the rotary abutment 15 to prevent leakage of fluid between the drum and abutment. The longitudinal side edges of the packing strip 114 are provided with V-shaped grooves 118 adapted to be engaged by the inclined walls 113 of the plate 112. Screw holes 116ª are provided to secure the plate 112 to the arm.

It will be noted that the base of the packing strip 114 is of slightly smaller dimensions than the dovetail groove in the plate 112, to permit the springs 117 to maintain the concaved seat 115 of the packing strip in engagement with the cylindrical wall of the rotary abutment 15. Surrounding the drum 20 is a split cylindrical packing ring 119 which is adapted to engage the outer wall of said drum, with the ends of the ring fitted into engagement with the upper portion of the V-shaped groove 118 of the packing strip 114. The side walls 113 of the plate 112 are curved coincidently with the curvature of the drum 20, so that the cylindrical packing 119 will present a circular outer wall to the rotating piston blades 95.

The boss 40 of the disk and the thrust nut 29 and nut 31 are likewise present in this construction. In either preferred or modified form, the large nut 29 binds the bushing in place and is supplied with a righ-hand thread while the thrust nut 31 has a left-hand thread to cause overall lengthening of the nut assembly to compensate for wear and take up end play of the shaft.

Referring to Figs. 3, 7, 8, 9 and 10, there is shown an enlargement 120 of the cylinder castings or casings 1 and 2, located at a point on said casing which is adjacent to the rotary abutment casings 9 and 10. This enlargement extends longitudinally of the cylinder casing and is provided with a longitudinal combustion chamber 121, into which is inserted a liner or sleeve 122, as shown more particularly in Fig. 4.

The liner or sleeve comprises two cylindrical collars or rings 123 and 124 connected together by a semi-cylindrical member 125 having a longitudinal opening or port 126 adapted to aline with a passage 127 in the enlargement 120, which connects the combustion chamber 121 with the expansion chamber 17. Diametrically opposite the port 126 of the liner 122 is formed a port 128 in the ring 124 adapted to aline with a port 129 in a valve casing 130, which is formed integrally with and extends above the enlargement 120. The valve casing 130 likewise extends longitudinally of the cylinder casing 1. The port 129 is located at one end of the valve casing 130 and is alined with the port 128 in the liner 122.

Referring to Fig. 7, a passage 131 is shown as formed in an enlargement on the valve casing 130, and is connected at one end by a pipe 132 which is in communication with a source of compressed combustible fluid. The inner end of the passage is provided with a port 133 leading into the valve chamber, in which is rotatably mounted a valve 134. In the outer wall of this valve adjacent its end is formed a circumferential pocket 135 adapted to aline with the port 129, when a pocket 136 in a valve 137 rotatably mounted in the combustion chamber 121 alines with the port 128 in the liner 122 to admit compressed combustible mixture to the combustion chamber 121.

The valve 137, shown in perspective in Fig. 6, comprises a substantially round transverse bar or rib 138 with laterally-projecting curved wings 139 formed intermediate the ends of the bar and integrally with the bottom of the rib, with the wings and the bottom of the rib curved on an arc of a circle, the radius of which being substantially equal to the radius of the cylindrical combustion chamber 121 formed by the inner wall of the liner 122, but having a tendency to spring outwardly, as shown in Fig. 10, wings 139 being of greater length than port 126. Formed integrally at the ends of the bar 138 are annular disks 140 and 141, the pocket 136 being provided in the disk 141 adjacent to its periphery. The disks 140 and 141 are rotatable within the respective rings 123 and 124 of the liner 122, as is also the valve 137.

Mounted in a groove formed in the disk 141 is a split packing ring 142, having its ends secured within the groove adjacent the pocket 136, with the ends of said ring terminating in the side walls of said pocket. Parallel to the first-mentioned groove is a second groove 143 in which is adapted to be mounted a split packing ring 144. These rings engage the inner wall of the collar 124 to prevent leakage of the combustible fluid between the outer periphery of the disk 141 and the collar 124.

The open space between the rib 138 and the disks 140 and 141 of the valve 137 is adapted to a line once every revolution of the valve with a longitudinal port 145 formed between the ends of the valve casing 130 and in the cut away portion of the liner 122, whereby compressed air admitted to the chamber 147 of the valve casing 130 is adapted to freely pass through the combustion chamber 121 through ports 126 anl 127 into the expansion chamber 17 of the motor cylinder. The passage or port 145 is cut through the partition between the valve casing 130 and the combustion chamber 121.

Formed in an enlargement 148 on the valve casing 130 is a passage 149 adapted to admit compressed air from a conduit 272 which is connected to a source of compressed air, through a port 151 to the chamber 147 in the valve casing 130.

The valve 134 is similar in construction to the valve 137, with slight variations. It will be seen that the pocket 135 formed at one end of this valve is of greater circumferential extent than the pocket 136, while the wings 152, combined with the rib 153, cover more than a semi-cylindrical portion of the valve chamber. The disks 155 and 156 (Fig. 10), formed integrally at the ends of the rib 153, revolve on the inner wall of the valve casing 130. The pocket 135 is formed in disk 155.

The disk 155 is provided with a peripheral groove 146 in which is located a split ring 157. A second groove 158 on the opposite side of the pocket 135 is provided with a split ring 159. In an annular and centrally disposed groove in the ring 155 is secured a packing 160 by means of screws 161, the ends of the split ring terminating adjacent the end walls of the pocket 135.

The disk 156 on the other end of the rib 153 is provided with an annular groove 162 in which is mounted a split packing ring 163.

Similarly, the disk 140 at one end of the rib 138 of the valve 137 is provided with an annular groove 164 in which is mounted a split packing ring 165.

A dowel pin 166 (Fig. 7) is secured in the periphery of the disk 155 of the valve 134 and projects through a perforation in the packing ring 160.

The valve 134 is provided with integrally formed stub shafts 167 and 167ª which are rotatable in bearings in the end walls of the valve casing, while the rotary valve 137 is also provided with integrally formed stub shafts 168 and 168ª, these shafts likewise being mounted in bearings in the ends of the combustion chamber. Keyed to the respective shafts 167 and 168 are intermeshing spur gearing 169, 170, Figs. 9 and 10 the gearing being of such a size that the ratio of the speed between the gearing 170 and 169 is as 2 to 1, with the speed of shaft 167 and likewise valve 134 being equal to the speed of the shaft 24.

The shaft 168 is connected by appropriate gearing, later to be described, to be driven by the main drive shaft 24, (see Figs. 17 and 18).

Formed in longitudinal alinement with the combustion chamber 121 is a similar combustion chamber 172 provided with a rotary valve of similar construction to the valve 137 but with the pocket 136 in the valve located at a diametrically opposite point in the combustion chamber 172.

A second valve chamber 173 is formed in longitudinal alinement with the valve chamber 130 and is provided with a valve 134ª which is of similar construction as the rotary valve 134, but with the pocket 135 located approximately 90° in advance of the pocket 135 of the valve located in the chamber 130. It will be seen later that the different positions of the two valves in the valve chambers and the different positions of the valves in the combustion chambers will cause the admission of a compressed combustible mixture to the expansion chamber of one cylinder while simultaneously admitting compressed air to the expansion chamber of the second motor cylinder.

The respective stub shafts 167ª and 168ª of the valves 134 and 137 are connected to the valves 134ª and 137ª in the respective chambers 173 and 172, so that the longitudinally alined valves are rotated at the same speeds as are the similarly positioned valves connected with the first motor cylinder.

Referring to Figs. 1, 1ª and 2, it will be seen that a carburetor 176 is connected in the usual manner by a fuel lead 177 from a source of supply, and also with the atmosphere, by means of a casing 178 having an automatically controlled valve for regulating the supply of air to the carburetor. A manually operated choke valve 179 is mounted in the air conduit 180 connecting the casing 178 with the carburetor.

The carburetor is connected as shown, in Figs. 1, 1ª, 2 and 28 by means of a conduit 180 to 178 which has a conduit 181ª connected to it and a valve 400 which is connected by means of conduit 181, to a T-joint 182 on the ends of which are nipples 183 screwed into threaded openings 184 formed in the outer shells 185 of the compression chambers 85 of the low pressure compressors for the combustible mixture from the carburetor.

In a pocket in the boss 186 formed on the casing 185 of the compressor is removably mounted a threaded plug 187 (Fig. 21). The plug is provided with an exhaust passage in which is mounted a check valve 188 adapted to be located on the seat 189 during the suction stroke of the pistons and which is adapted to be moved outwardly upon the compression stroke for exhausting the compressed combustible mixture through the exhaust pipe 190. Both of the compression chambers 85 of the low pressure compressors are connected together through the exhaust pipes 190 by a conduit 191, as shown in dotted lines in Figs. 1 and 2. A common conduit 192 is adapted to conduct the compressed combustible mixture from these compression chambers to the conduit 193. A by-pass 194 connects this conduit with a high pressure compressor 195 for additionally compressing the mixture when not sufficiently compressed by the low pressure compressors. A check valve 196 is employed in the conduit 193 to prevent the compressed combustible mixture from the high pressure compressor from entering the low pressure compressors. A conduit 197 connects the conduits 193 and 215 with a tank 198 for storing the compressed combustible fluid from the high and low pressure compressors. A check valve 199 prevents the return of the compressed combustible fluid from the tank to either of the high or low pressure compressors.

Referring to Figs. 1, 1ª, 2, 21, 22 and 30, it will be seen that a portion of the compressed combustible mixture, which has not been exhausted through the exhaust pipe 190, will be pocketed by the chambers 87ª in the rotary abutments 15 or 16 of the low pressure compressors, and when the piston blade 34 is seated within this chamber as the blades are rotating, that portion of the compressed combustible mixture in this pocket will be further compressed by the blade. Unless this compressed mixture is carried off, it will find its way back into the combustion chamber and prevent the proper working of the compressors. The passage shown in Fig. 22 in the boss 89 and controlled by the valve 88ª is in communication with the pocket 87ª of the abutment 15 of the first compressor and connected by a conduit 200 to the conduit 193 which leads to the storage tank 198. The ring 41 of the rotor structures of the low pressure compressors is provided with passages 73, as shown in Fig. 30 to permit the escape of the compressed combustible mixture through this passage when that portion of the rotor structures is passing the pockets 87ª in the rotary abutments 15 and 16, the piston blade 34 moving in the rear of this passage.

In Fig. 23 is shown a second passage 201 in the head 7$^b$ which is connected by a conduit 200$^a$ with the conduit 191 for conducting the mixture compressed in the pocket 87$^a$ in the rotary abutment 16 of the second compressor to the storage tank 198.

The piston blades of the second low pressure compressor are set at an angle of 90° relative to the piston blades of the first compressor. In other words, while the piston blades of the first compressor are located in the vertical diameter of their respective compression chamber, the piston blades of the second compressor are located in the horizontal diameter of the second compression chamber. The pockets 87$^a$ of the rotary abutments are located in the vertical diameter with the pockets of the first abutment at the bottom of the abutment casing while the pocket of the second abutment is at the top.

The positions of the abutments and piston blades of the engine rotors are similarly placed relative to each other.

Referring to Figs. 23 and 36, the construction of the high compressor 195 for the combustible mixture is shown more in detail. A cylinder 202 forms the shell of a compression chamber 203, the cylinder being mounted eccentrically with the reduced end 24$^a$ of the shaft 24. A cylindrical rotor 204 is mounted concentrically with the shaft 24$^a$ and keyed to said shaft, the shaft passing through a hollow boss 205 formed centrally of a diametrically disposed web 206. Near the upper end of the casing 202 is formed an admission port 207 which is connected by the pipe 208 to the by-pass 194.

Adjacent the admission port 207, a threaded plug 209 is screwed into a threaded opening in the casing 202 and is provided with a valve seat 210 for a check valve 211, the check valve having a stem slidable in a web 212 in the plug 209. A plate 213, seated within a recess in the outer wall of a boss 214 on the casing 202, where the threaded opening is formed, is adapted to maintain the plug in position, the plate being bolted to the casing. An exhaust pipe 215 has a threaded end screwed into a central threaded opening in the plate 213. This exhaust pipe is connected with the conduit 197 at the point in said conduit where the pipe 193 adjoins the conduit 197.

Within the upper end of the web 206, and extending through the wall of the rotor 204, is a longitudinal groove 216 provided with a packing gland which is shown more in detail in Figs. 43 to 49, inclusive.

The base of the piston comprises two longitudinal members 217 and 218 joined together with their inner faces abutting each other and their outer side walls in sliding engagement with the side walls of the slot 216.

Spaced from each other are vertical passages 219 formed between the pairs of base members 217 and 218, with a semi-cylindrical portion of the passage in each member. These passages open from the under side of the base member. Below these passages and in alinement with the same are sockets 220 which are adapted to receive coiled springs 221 adapted to urge the base members outwardly of the groove 216.

Within spaced cavities 222, formed in the base members and between their inner faces, are seated flat springs 223 which are gripped by the lower ends of the base members, when the two base members are secured together by means of screws 224. The upper free ends of the springs project into a cylindrical passage 225 formed longitudinally of the upper end of the secured base members. In this passage is seated a rock shaft 226 having slots 227 in its bottom face adapted to receive the free ends of the flat springs 223 for maintaining the rock shaft 226 in a normal position (see Fig. 45). The rock shaft 222 is slotted longitudinally as shown at 228 to receive the depending flange 229 of a T-shaped packing strip 230, having wings 231 which are curved on their outer faces on an arc of a circle, the diameter of which is substantially equal to the diameter of the inner wall of the cylindrical casing 202.

The air being compressed between the rotor 204 and the interior wall of the casing 202 by the ascending strip 230, referring to Fig. 36, will exert a force beneath the on-coming wing 231 and cause the said strip to rock about its axis in rock shaft 226, thus causing said wing to hug the casing, the pressure increasing against the wing as the strip 230 ascends to its highest point directly over the shaft 24$^a$, or at the top of the casing, and in turn decreasing in like pressure against the following wing as the strip recedes.

The coil springs 221 are for the purpose of holding the strip 230 bodily against the interior wall of the cylinder 202 and at the top portion thereof, when no air or gas is being compressed under the wings 231.

The depending flange of the packing strip is perforated as shown at 232 for the reception of rivets to secure the T-shaped packing strip securely to the rock shaft 226 with the flat springs 223 maintaining the depending flange 229 of the packing strip radially of the rotor 204.

The rotor 204 is positioned relative to the inner wall of the cylindrical casing 202 so that the outer face of the packing strip 230 will be in engagement with the cylindrical wall of the casing 202 when the rotor 204 is revolved within said casing, since the coiled springs 221 force the secured members 217 and 218 of the base outwardly from the groove 216.

At the top of the casing 202, and in the boss 214 is formed a longitudinal slot in which is slidably mounted a packing strip 233. The packing strip runs longitudinally of the casing 202 and is slightly wider than the head composed of the two wings 231 of the packing strip 230, with the base portion of said packing strip curved coincident to the curvature of the inner wall of the cylindrical casing 202. The packing strip is provided with pockets 234 in which are seated springs 235 adapted to press at one end against a nipple 236 formed on the under side of a plate 237 which is rigidly secured to the boss 214. The other end of the spring presses against the bottom of the pocket 234 and forces the packing strip inwardly to be engaged by the outer wall of the rotor 204 to prevent leakage of the combustible mixture at this point. An oil tube 238 connected with the lubricating system of the engine is adapted to supply oil to a passage 239, the oil passing around the side walls of the packing strip for lubricating the packing strip and likewise the walls of the cylinder casing 202 and the outer wall of the rotor 204.

A non-inflammable gas compressor 240 connected with the cooling system for promoting circulation of the cooling fluid is mounted in alinement with the high compressor 195 within a chamber 241 (Fig. 23) and separated from the chamber 203 of the high pressure compressor by a circular head or plate 242, and since this compressor is an exact duplicate in construction of the high pressure compressor 195, a description of the structure of the compressor will serve as a full understanding of the structure of the non-inflammable gas compressor. The non-inflammable gas compressor is connected to a source of non-inflammable gas for supplying the compressor. The capacity of the non-inflammable gas compressor is less than the high pressure compressor for combustible gas and is therefore of less length than the high pressure compressor.

A conduit 243 shown in Figs. 1ª and 2 is provided with a coil 244 maintained in a cooling medium e. g. air or water, for cooling the compressed non-inflammable gas from the compressor with the coil extended at 245 to lead into a casing 246 which is connected with the cooling system of the engine for promoting the circulation of the cooling medium in the system. A description of the cooling system and its connection with the non-inflammable gas compressor 240 will be presently outlined.

In alinement with the non-inflammable gas compressor and separated from the same by a head or plate 247 is an air compressor 248 which is adapted to deliver compressed air to the motor cylinders in alternation with the compressed combustible mixture from the high and low pressure compressors. The construction of the air compressor is identical with the construction of the non-inflammable gas compressor and the high pressure compressor for the combustible gas, and therefore no further details of the structure will be given, except those parts which are necessary to set forth certain connections for connecting the air compressor with the motor.

Atmospheric air is admitted to the air compressor as clearly shown in Fig. 1ª through a casing 249 provided with a valve for cutting off the supply of air to the air compressor when the pressure in the exhaust pipe 250 from the air compressor reaches a predetermined pressure. In order to accomplish this purpose, a by-pass 251 connects the exhaust pipe 250 with the casing 249 with the pressure in the exhaust pipe and by-pass acting upon a diaphragm controlling the inlet valve which admits air to the air compressor. The exhaust pipe 250 is connected by a pipe 252 to a storage tank 253 for storing the compressed air. A safety valve 254 connected with the storage tank is adapted to let off air when the pressure in the tank reaches a predetermined degree. A conduit 255 connects the storage tank with the manually-operated valve casing 256.

A union 257 connects the storage tank 198 for the compressed combustible mixture with the valve casing 256.

Referring to Fig. 11, the valve 258 in the valve casing 256 is shown cylindrical in form and provided with annular passages 259 and 260 adapted to aline respectively with a series of slots 261 and 262 formed in the cylindrical wall of a sleeve 263. An annular channel 264 in the cylindrical valve casing 256 is adapted to receive compressed combustible mixture from the conduit 257, while another channel 265 in the inner wall of the casing 256 is adapted to receive compressed air from the conduit 255.

Horizontal ribs 264ª, shown in Fig. 29, are formed at diametrically opposite points in the channels 264 and 265 and divide these channels in half with the free end of the ribs in engagement with the outer wall of the sleeve 263. The ribs 264ª cause the compressed combustible fluid or the compressed air to enter the upper half of the sleeve only and through the openings 261 or 262 in that portion of the sleeve, then by way of the passages 259 or 260 in the valve and exhausting through the lower openings 261 and 262 into their respective conduits 269 and 270.

The valve is maintained in closed position by means of a diaphragm 266 which is centrally perforated for the reception of a boss 267 on one end of the valve, with the boss secured to the diaphragm at this point. The diaphragm is secured to the forward end of the valve casing by a ring bolted to that end of the casing.

A bell crank lever 268 is pivotally connected at one end with the boss 267, and through operating rods extending to the dash of the automobile is adapted to move the valve 258 longitudinally of its casing 256 against opposition by the diaphragm 266, and thereby place the annular channels 259 and 260 of the valve 258 in alinement respectively with the series of openings 261, and 262, in order that the compressed mixture and compressed air may pass through the valve and enter their respective conduits 269 and 270. The spring diaphragm by its flexibility maintains the valve in closed position.

The valve is properly supplied with packing rings to prevent leakage of fluid past the passages 259 and 260.

Referring to Fig. 1, the conduit 270 carrying compressed air is connected to the pipe 271 with the ends of said pipe connected by conduits 272 and 273 to the respective valve chambers 130 located at the tops of the cylindrical casings 1 and 2 forming the motor cylinders. As shown in Fig. 42, the pipe 269 which carries the compressed combustible mixture is in communication with a casing 274 provided with a plurality of perforated screens 275 to prevent fire from the combustion chamber backing up into the storage tank 198.

The casing 274 is connected by conduits 276, 277 to the valve casings 130 or to 120 by means of conduits 132 and 132ª for conducting compressed combustible mixture to said casing.

As shown in Figs. 1ª and 2, the by-pass 194 is controlled by a valve connected to a diaphragm, both of which are mounted in the valve casing 278, the construction of which being well known in the art. The exhaust pipe 215 which leads from the high pressure compressor to the storage tank 198, is in communication with the valve casing 278 by means of a pipe 279, whereby pressure in the exhaust pipe is exerted against the diaphragm in the casing 278 to maintain the valve closed when the low pressure compressor is discharging at the predetermined pressure for example 70 pounds per square inch, and consequently as long as the pressure in the exhaust pipe 215 is greater than the pressure in the by-pass 194, the valve in casing 278 remains closed.

When the pressure of the combustible mixture compressed by the low pressure compressors is less than the predetermined pressure, the valve in the casing 278 will remain open so that the compressed combustible fluid from the low pressure compressors will travel through the by-pass 194 instead of through the conduit 193 which connects with the storage tank 198 and then to the high compressor for the combustible gas.

The tank 198, under normal working conditions, is adapted to store compressed combustible mixture at a predetermined pressure so that the pressure in this tank, in cooperation with the check valves 196 and 199 will prevent combustible fluid in the low pressure compressors traveling through the conduits 193 and 197 to the storage tank, until the pressure in the low pressure compressor has reached the pressure desired, and which pressure is below the point where spontaneous ignition of the combustible mixture will occur.

When the pressure of the combustible mixture in the by-pass 215 has been raised to the pressure desired by the high pressure compressor, and the pressure against the diaphragm in the valve casing 278 becomes greater than the spring pressure, it being understood that the usual adjustable spring is provided, the gas pressure in the by-pass 215 against the diaphragm actuates the valve to close the by-pass 194 when the low pressure compressor will deliver directly to the storage tank and the motor cylinders. At this time, the high pressure compressor will idle.

A timer 280, shown in Figs. 1 and 2, operated through connections with the valve shaft, is adapted to control the time of ignition of the combustible fluid in the combustion chambers by means of the spark plugs 281 and 282.

The timer is mounted on a stub shaft 280ª (Fig. 10) formed integrally with the valve 137 in the combustion chamber 121 and projecting beyond the combustion chamber. Two contacts are provided for causing a spark alternately in each spark plug at each half revolution of the piston structure and when the piston blade 34ª of each motor has opened the port 127 leading to the expansion chambers.

As shown more particularly in Figs. 7 and 8, a passage 283 adapted to receive the spark plug leads directly into the combustion chambers 121.

When the automobile is traveling down a hill, the engine may be braked by closing the valve 258 through operation of the bell crank lever 268 by a foot pedal, the valve being closed in the position shown in Fig. 11. Therefore, the compressed combustible fluid and the compressed air is cut off from the motor. When this occurs, an air valve shown in Figs. 3 and 20 is adapted to admit air to the motor cylinder but is closed to the atmosphere when the motor is being operated by compressed air or the ignited compressed combustible mixture by reason of the spring pressure existing in the valve casing at the time the mixture and the compressed air are expanded. A separate air valve is employed in connection with each expansion chamber of the motor cylinders.

In a bell-shaped valve cage 284 is screwed a plug 285 having a valve seat 286 on which the spring-pressed valve 287 is adapted to seat. A spring 288, having one end seated in a cup-shaped member 289 is adapted to maintain the valve closed except when the motor is operating to compress air.

A perforated diaphragm or screen 290 is secured in the mouth of the bell-shaped cage 284 to prevent dust and dirt from being drawn into the motor cylinder. Nipples 291 connect the valve cages 284 with the interiors of each of the motor cylinders.

To the exhaust pipes 292 of the motor cylinders, in Figs. 1, 3, 13, 14 and 15, is connected an exhaust conduit 293 provided with a cylindrical enlargement 294 in which is rotatably mounted a valve 295. This valve is connected by means of a link 301 to suitable means for manual operation so that when the choke valve is cut off, this valve will close the passage 296 which leads to the muffler through pipe 297. At this time, with valve 258 in casing 256 closed, the pistons of the motor cylinders are drawing in air and compressing it and forcing it through the exhaust pipe past a check valve 298 in a passage which leads from the enlargement 294 and which is connected by a conduit 299 to the air storage tank 253. The check valve 298 prevents the return of the compressed air from the storage tank to the exhaust pipe. A safety valve 300 is mounted in the air line 299 and so set as to permit the escape of the compressed air under pressure in the tank when the pressure in the line reaches a predetermined degree.

As shown in Figs. 1, 2, 3 and 24, semi-cylindrical water jackets 302 are integrally formed with one-half of the cylindrical casings 1 and 2 of the motor cylinders and the casings 185 of the low pressure compressors to form cooling chambers 303 between the jackets and the respective casings. Connected with these casings at the upper end is a conduit 304, which extends longitudinally of the motor unit and low pressure compressors, and is adapted to supply water to the jackets 302 from a radiator 305 through a conduit 306 which is connected to the bottom of the radiator. The injector tube 245 shown in Figs. 1ª and 2 is connected with the non-inflammable gas compressor 240 for injecting gas under pressure to the pipe line 304 through the injector chamber 246, in order to promote circulation of the water through the cooling system connected by means of couplings at ports 307 to the semi-cylindrical cooling chambers of the engine cylinders and compressor cylinders. This water is adapted to find its way through the outlet ports 308 Figs. 3 and 24) at the bottom of the motor and compressor cylinders and is carried off by the couplings 309 which connect with the return conduit 310, this conduit being connected to the upper end of the radiator.

From the inlet pipe 304 extend smaller connections 311 which lead to the various cylinder heads of the motor and the low pressure compressors, so that a cooling medium such as water is delivered to the internal water jacket 27 formed between the drum 20 and the boss 23. The downwardly-extending passage 312, as shown in Figs. 22, 23 and 25, of the various heads of the motor cylinders and the compressor cylinders, is connected to a return conduit 313 which likewise leads to the top of the radiator 305.

As shown in Figs. 3, 24 and 26, a nozzle 27ª is located in chamber 27, and at the inlet to the chamber for spraying water from the cooling system into the chamber.

As shown more particularly in Fig. 2, the return conduit 314 is connected to the radiator 305 above the level of the water and is adapted to carry off the compressed non-inflammable gas which separates from the water in the radiator and is conducted through said conduit to the non-inflammable gas compressor 240. A filter 315 is located in this conduit to eliminate any moisture from the gas, with a return conduit 316 connecting the filter with the top of the radiator for delivering to the radiator the moisture extracted from the gas.

As shown in Figs. 1ª and 36, the high pressure compressor for combustible gas, the non-inflammable gas compressor and the air compressor are all provided with a water jacket 317 which forms with the casing 202 an annular cooling chamber 318 that is adapted to receive water under pressure from the radiator through the conduit 319 with the conduit 320 adapted to carry off the cooling medium. The water jacket extends substantially around the casing 202.

From an inspection of Figs. 22 and 23, it will be seen that the main drive shaft 24 is provided with a bore 321 and the rotary abutment shaft 74 is provided with a bore 322, the several bores extending throughout the full length of the respective shafts. The bore 322 of the rotary abutment shaft 74, at its rear end is in communication with a conduit 323. The conduit 238 connects the conduit 323 with the interior of the high pressure compressor for the combustible mixture, and as has been explained, the oil from this conduit is carried past the packing gland 233 to the inner walls of the high pressure compressor. A conduit 324 connects the conduit 323 with the interior of the non-inflammable gas compressor 240. A conduit 325 connects the conduit 323 with the interior of the air compressor for lubricating the inner wall of the air compressor. A plug 326 is screwed into a threaded opening in the cylinder head 72 which forms the end of either unit, whether preferred or modified. A connection 327 joins the plug 326 with the conduit 323. A passage 328 in the plug is in alinement with a passage in the connection 327 and opens into an oil chamber 329 in the plug 326. A manually-operated valve 330 is adapted to close the passage 328 from the passage 331 which leads into the oil pump chamber 332 more particularly shown in Fig. 41.

The pump chamber 332 is formed in the head 72 and between the bushing 84 and the rotor 204ª of the non-inflammable gas compressor in the modified form or between the bushing 84 and the rotor of the air compressor. Keyed to the reduced end of the shaft 24ª is a rotor 333 having a piston blade 334 slidably mounted in a longitudinal pocket 335. Springs 336 maintain the outer end of the blade in engagement with the inner wall of the pump chamber 332.

In communication with the conduit 323 (Figs. 1ª and 2) is a conduit 337 which is connected with a tank 338 for storing lubricant. A removable plug 339 is mounted in the top of the tank 338 whereby lubricant may be filled into the said tank. Oil flows from this tank through conduit 337 to conduit 323 which returns the oil to the pump chamber 332, as shown in Figs. 2 and 23. A valve 340 is adapted to cut off the oil returning from the lubricating system to the pump, when desired. The valve 330 controls the rate of flow for the returning lubricant to the pump chamber 332 and likewise cuts off the supply of oil from the storage tank 338. Through the regulation of valve 340, the pressure in the lubricating system is decreased or increased.

Oil from the pump chamber 332 is forced under pressure to the bore 321 of the shaft 24. Radial passages 341 passing radially through the rotors 204, 204ª and also through the rotor of the air compressor carry lubricant to the longitudinal slots 216 in the webs 206 of said rotors and to the walls of their respective cylinders.

Other radially disposed passages lead from the bore 321 to the different bushings on the shaft. Radial passages 342 lead from the bore to the rotary disks 32 of the piston construction of the low pressure compressors and of the motors.

An annular passage 343 in the forward end of the shaft 24 is adapted to aline with a passage 344 in the forward cylinder head 5. A connection 345 is adapted to conduct oil to the boss 75 which provides a bearing for the forward end of the rotary abutment shaft 74. The end of this connection alines with an annular channel 346 in the wall of this shaft with radial passages leading from this annular channel into the bore 322 of the shaft. Lubricant is carried through the bore 322 back to the return conduit 323. Radial passages 347 leading from the bore 322 through the rotary abutments are adapted to conduct oil to the inner walls of the rotary abutment casings of the low pressure compressors and the motors.

Referring to Figs. 1ª and 2, in connection with Fig. 28, an air valve is shown in the casing 178 for controlling the combustible mixture to the compressors and this control is automatic with the closing of the valve, being determined by the pressure existing in the high pressure compressor for the combustible mixture. The bottom of the casing is provided with an opening with a valve seat 348 upon which is adapted to be seated a valve 349, to which is connected the conduit 181ª. The stem 350 of the valve is rigidly connected with a diaphragm 351 with the pipe 100 placing the upper face of the diaphragm 351 in communication with the pressure in the high pressure compressor for the combustible mixture through the connection of the pipe 100 with the exhaust pipe 215. A spring 353 is adapted to aid the diaphragm 351 in maintaining the valve 349 open.

When the pressure in the exhaust 215 exceeds the predetermined amount the pressure will be sufficient to overcome the tension of the spring 353 and the diaphragm 351 and force the valve 349 on its seat 348 and therefore preventing the combustible mixture from issuing from the carburetor. The construction of the carbureter is such that when the air is cut off no combustible mixture will be delivered to the low pressure compressors and consequently the motor will be required to operate on the combustible mixture stored in the tank 198.

As shown in Figs. 7 and 10, a screen 371 covers the port 128 in the ends of the sleeves or liners 122 of the combustion chambers with which the pockets 136 of the valves 137 aline to prevent any of the burning mixture that may remain in the combustion chamber from escaping into the passage 131 and pocket 135 and igniting the fresh charge of compressed combustible mixture in this passage and pocket when the valve 137 opens communication between the combustion chamber and the same.

The operation of my combined combustion and compressed air engine, which is adapted to be converted into an air compressor when an automobile upon which the engine is mounted is traveling down a hill, is as follows:—

The choke valve 179 of the carbureter is set to supply a rich mixture to the low pressure compressors through the conduit 181, or 401, (Fig. 2) while the pedal that operates the bell-crank lever 268 is moved to position the valve 258 to admit compressed air and compressed combustible mixture, respectively, from the tanks 253 and 198 to the valve casing 130 shown in Figs. 3, 7 and 8. The crank is applied to the end 24ᵇ of the shaft 24 and the shaft is rotated, thereby causing rotation of piston structures, the compressors, the rotary abutments and the valves 134 and 137. When the valves 134 and 137 are located in the position shown in Fig. 8, of either motor, the passage 149 which connects with the compressed air storage tank 253 is open to the combustion chamber 121 through the ports 151 and 145, while the valve 137 has been moved to open the port 126 with the piston 34 just passing the port 127. Compressed air is then admitted to the expansion chamber 17 of the motor cylinder and between the blade 34 and the rotary abutment 15. The compressed air acting on the piston blade 34 assists the operator in starting the engine, if the pressure of the air in tank 253 is sufficient for the purpose. By referring to Fig. 22 of the drawing, it will be seen that since blade 34 of the first motor is traveling 90° in advance of blade 34$^a$ of the second motor, the blade 34 of the second motor is located in pocket 87 of the rotary abutment 16, while the compressed air of the first motor is absorbing heat and expanding between the blade 34 and the abutment 15 and thereby driving piston blade 34. Before the blade 34$^a$ of the second motor opens port 127 and the tandem valve 134$^a$ is properly positioned with valve 137$^a$ and opening port 129, compressed combustible mixture passes through the pocket 135 of the valve 134$^a$, through the port 129, through pocket 136 of the valve 137$^a$, and into the combustion chamber 121, and is being fired by the spark plug in the combustion chamber. The firing takes place after the valve 137$^a$ has opened the port 126 and the piston blade 34$^a$ has opened the port 127 which leads into the expansion chamber. It will be seen that not only is the compressed air acting on the piston blade 34 of the first rotor, but the ignited expanding combustible mixture, which is under pressure, is acting on the piston blade 34$^a$ of the second rotor.

When blade 34$^a$ of the first motor unit is in the position as shown in Fig. 3, combustible mixture is expanding between the blade 34$^a$ and abutment 15, and also between blade 34$^a$ and abutment 16; but as soon as the blade 34 of the second motor unit opens port 127, then compressed air will be expanding between the blade 34 and abutment 16, and combustible mixture will be expanding between blade 34$^a$ and rotary abutment 15, and when blade 34 of the first motor opens port 127, then compressed air will be expanding between blade 34 of the second motor and abutment 16, and also between the blade 34 and abutment 15 of the first motor, and as soon as blade 34$^a$ of the second motor opens port 127, the compressed air will be expanding between blade 34 of the first motor and abutment 15, and combustible mixture will be expanding between blade 34$^a$ and abutment 16 of the second motor. This completes the cycle of both motor units.

When the blade 34$^a$ of the first motor is located in the position shown in Fig. 3, with the ignited combustible mixture about to enter the expansion chamber 17, the positions of the other blades are as follows:—Piston blade 34 of the second motor is opening the exhaust port of the expansion chamber 18 and moving towards the pocket 87 of the abutment 16. Blade 34 of the first motor is past the lower dead center and is moving toward the exhaust port with expanding compressed air at its rear and in front of blade 34$^a$. Blade 34$^a$ of the second motor is 90° in advance of blade 34$^a$ of the first motor and has a charge of ignited combustible mixture between it and the abutment 16, the expanding mixture acting to drive this blade 34$^a$.

The valve 137 is so timed relative to the valve 134 that the pocket 136 of valve 137 will aline with the passages 128 and 129 between the combustion chamber 121 and the valve casing 130, as the circumferential pocket 135 of the valve 134 likewise alines with the port 129 and the port 133 of the passage 131. Again, it may be stated that the timing of the valve 137 relative to the timing of the valve 134 is such that the parts of valve 137 which are effective to close port 126 are so positioned that a direct path through the combustion chamber 121 will be had between the expansion chambers 17 and 18 of the motor casing and the chamber 147 of the valve casing 130, with the valve 134 permitting open communication between the ports 145 and 151 to permit compressed air from the passage 149 and pipe 272 to enter the chamber 147 and pass directly through the combustion chamber to the expansion chamber. The supply of combustile mixture to the combustion chamber 121 is in alternation with the supply of compressed air, with the valves 134 and 137 cooperating to permit the alternate supply of the two fluids to the expansion chamber.

In starting the engine when cold, it is understood that no heat from the cylinder walls is imparted to the compressed air entering the expansion chambers of the engine, so that the impetus to the piston blades 34 given by the expanding compressed air will not be as great as when the walls are heated by the ignited combustible mixture. As soon as the combustible charges are fired, the power developed in the engine will be rapidly increased. An important feature of the engine is its capacity for converting heat developed in the cylinders by the explosions of the combustible mixture into work for driving alternate piston blades.

The burning and expanding gases will fill the small space between the rotary abutments 15 and 16, and the piston blades 34$^a$ of each engine rotor, and since the blades are in the process of rotation, the expanding ignited gases will act on these blades and force them around the expansion chamber, with the expanded compressed air of each cylinder traveling in advance of the piston blade 34$^a$. The compressed air will be exhausted through the exhaust port 292 which is open to the atmosphere.

At about the time that the piston blade 34 is uncovering the exhaust port, it is ready to enter the pocket 87 of the rotary abutment, since the rotary abutment rotates at twice the speed of the piston blades. It will be necessary, therefore, for the pocket 87 to be positioned adjacent the concaved groove 86 in the drum 19 at each half revolution of the rotor so that the blades may be pocketed within this chamber when passing between the rotary abutment and the drum. It will be seen that the portion 89$^a$ of the rotary abutment will engage that portion of the wall of the rotary abutment chamber which is adjacent to the port 126 and therefore close that end of the expansion chamber after the blade 34 has passed through the chamber 87 of the rotary abutment. Compressed air is again admitted to the expansion chamber behind piston 34. The alternate admission of the compressed air and compressed combustible gases between each of the piston blades 34 and 34$^a$ and the rotary abutment will be continuous.

The valves 134$^a$ and 137$^a$ of the second motor have their parts diametrically positioned to the similar parts of the same valves of the first motor so that while compressed air is being admitted behind the piston blade 34 of the first cylinder, compressed combustible mixture will be admitted behind the piston blade 34$^a$ of the second cylinder, and while ignited compressed combustible mixture is expanding between the rotary abutment 15 and the piston blade 34$^a$ of the first cylinder, compressed air is being admitted in that portion of the expansion chamber of the cylinder which is located between the rotary abutment 16 and the piston blade 34.

The heat developed by the ignited expanding combustible mixture, and which is imparted to the cylinder walls of the drum, and which is ordinarily dissipated in internal combustion engines, is converted into work for expanding the compressed air admitted in alternation with the compressed combustible mixture, and since the expansion of the ignited combustible mixture takes place in substantially the first half of the expansion chamber, the water jacket 302 is only applied to this portion; but in cases where so desired, more cooling area may be used.

It will be seen that a triple cooling system comprising the use of water, non-inflammable gas, and compressed air is employed to eliminate the heat developed by the explosion of the burning mixture and that more power will be obtained from the engine by the alternate use of the compressed air.

If it be so desired, the choke valve 179 of the carburetor may be closed entirely and due to the carburetor construction prevent combustible mixture being drawn into the low pressure compressors in order to eliminate these compressors from doing work when starting the engine, since the compressed air and the compressed combustible mixture stored in their respective tanks is sufficient for the purpose.

The valve chamber 147 of the casing 130 forms an auxiliary chamber between the combustion chambers 121 and the storage tank 253.

When the engine is properly working, the choke valve of the carburetor may be opened to admit the proper quantity of air for producing a suitable combustible mixture for delivery to the low pressure compressors. As shown in Fig. 21, the combustible mixture is admitted through the port 184 through the compression chamber 85. The piston blades 34 and 34$^a$ alternately draw in the combustible mixture and compress said mixture by reducing the space between the blades and the rotary abutment 15 or 16 with the compressed combustible mixture being carried off past the valve 188 and through the exhaust conduit 190. A portion of the compressed combustible mixture is pocketed in the chamber 87$^a$ in the rotary abutment, and this is further compressed when either of the blades 34 or 34$^a$ are seated within this chamber.

Passages 73 in the rings 41 of the rotor structures of the low pressure compressors shown in Fig. 30 are adapted to carry off this additional compressed combustible mixture in the chamber 87$^a$ to the conduit 200 and 200$^a$ which are connected respectively to the exhaust conduit 193 of the low pressure compressor and the conduit 191. The other low pressure compressor simultaneously compresses a portion of the mixture which is drawn in from the carburetor and likewise delivers it through the conduit 191 to the conduit 193. If the combustible mixture compressed by the low pressure compressors has not reached the predetermined pressure, for example, 70 pounds, the pressure in the storage tank 198, referring to Fig. 1, is usually sufficient to resist the flow of the compressed combustible mixture from the low pressure compressors to the storage tank, the pressure from the storage tank acting upon the check valves 199 and 196.

When the pressure in the low pressure compressors is less than the predetermined pressure which as stated may be between 70 pounds and a pressure where spontaneous ignition occurs, the compressed combustitble mixture from both of the compressors will be delivered through the by-pass 194, through the conduit 208, to the high pressure compressor 195 where the pressure of the combustible mixture is raised to that desired. An automatic valve in the casing 278 is adapted to remain open to permit the combustible fluid from the low compressors to be conducted through the by-pass 194 to the high compressor. The valve is rigidly secured to a diaphragm within the casing 278, with the under face of the diaphragm being in communication or subjected to the pressure in exhaust conduit 215 from the high pressure compressor.

When the pressure in the low pressure compressors has been built up to the required pressure most suitable for efficient work in the engine, the pressure being greater on the side in contact with the conduit 215, will close the by-pass 194, and therefore the low pressure compressors will deliver the compressed combustible mixture directly to the storage tank and then to the motor. When the pressure in the system of the high and low pressure compressors rises above the predetermined pressure, back pressure from these compressors will be exerted through the conduit 100 on the diaphragm of the valve 178 which controls the carburetor causing the valve 349, as shown in Fig. 28, to close and therefore prevent any further possible mixture from being carried to the low pressure compressors and likewise to the high pressure compressors. During this time of the inoperativeness of the compressors for compressing the combustible mixture, the motor will be using the compressed combustible mixture in the storage tank 198, and when the pressure in the system falls below the required pressure, the valve 178 which controls the carburetor will be opened and permit combustible mixture to be again delivered to the low pressure compressors. The combustible mixture from the low pressure compressors will be delivered to the high pressure compressor automatically by reason of the valve in the casing 278 remaining open until the pressure in the low pressure compressors has been built up sufficiently to overcome the action of the pressure in the high pressure compressors and cut off communication between the low pressure compressors and the high pressure compressor.

When the engine is operating normally, air is being compressed by the compressor 248 and delivered through the conduit 250 and 252 to the storage tank 253. Air from this tank is delivered from the conduit 255 to the valve casing 256 and thence through the conduits 272 and 273 to the pair of motor cylinders in a manner as has already been described. The non-inflammable gas compressor 240 is now delivering compressed non-inflammable gas to the cooling system to promote circulation of the cooling medium in said system.

In the modified form shown in longitudinal side view in Fig. 2, with Fig. 24 disclosing more particularly the internal construction of a motor, no air compressor is employed and therefore the construction of the valve 258 is modified to the extent that only one passage is required for admitting a compressed combustible fluid to the combustion chamber adapted to be controlled by the manually-operated valve. Furthermore, it will be seen that the valve 134 with its casing and the necessary adjuncts are likewise omitted with the conduit 132 leading directly to the port 129 which opens into the combustion chamber 121. Furthermore, the air storage tank 253 with its connections is likewise omitted, as will be the extra gearing required for driving the valve 134.

The operation of the modified form shown in Fig. 2 differs from the preferred form in that the compressed combustible gases from the storage tank 198 which is supplied by the low compressors and the high compressors is ignited when each of the blades 34, 34ª pass the rotary abutment and open the port 127 so that an explosion takes place in the combustion chamber at every half revolution of each piston structure.

It will be seen that there are two cooling mediums since the benefits resulting from the cooling of the cylinder by the compressed air absorbing the heat are absent in this Fig. 2 form of the invention. The air valve 287, shown in Fig. 20, is not employed in this construction, since it is not intended that the rotary motors shall be converted into air compressors at any time, although the air valves may be employed in connection with this modified form for braking the engine when the automobile is traveling down grade. Furthermore, no valve 295 is necessary for diverting the compressed air from the engine cylinder to a storage tank.

The sliding valve 258ª of the modified form shown in Fig. 42 for admitting compressed combustible mixture from the tank 198 to the combustion chamber 121, differs from the tandem valve 258 of the preferred form, in that it is a single valve, since it is unnecessary to employ the passage 260 of valve 258 in this valve, as shown in Fig. 11, for admitting compressed air. The cylindrical sleeve or liner 263ª of the casing 256ª, is provided with but a single series of circumferential slots 261 for admitting compressed combustible mixture to the upper half of the annular groove 259, with the ribs 264ª shown in dotted lines, Fig. 42 for forcing the combustible mixture to enter the slots 261 in the upper half of the sleeve 263ª, the mixture passing through the annular passage 259 through the circumferential slots 261 in the lower half of the sleeve 263ª, into the channel 264, then into the conduit 269, whence it is conducted through various conduits and the screens 275 to the combustion chamber 121.

To the bottom of the casing 256ª, Fig. 42, is integrally formed a bracket 362 upon which is pivotally mounted a bell crank lever 363. One end of the bell crank lever is slotted at 364 adapted to receive a pin 365 mounted in the bifurcated end 366 of the lug 367. A lug 358, formed centrally on one end of the valve 258ª, has a diaphragm 369 and the base of the lug 367 secured to its free end. A link 370, pivotally mounted at the other end of the bell crank lever 363, is adapted to be connected to any suitable means within reach of the operator of the automobile. When the link 370 is operated, the bell crank lever 363 is actuated against the opposition of the diaphragm 369 to place the valve 258ª in open position as shown in Fig. 42. A release of the link 370 will permit the diaphragm 369 to slide valve 258ª to position the annular passage 259 in said valve out of alinement with the circumferential slots 261 and thereby prevent combustible mixture from the tank 198 or the compressors from delivering combustible fluid under pressure to the combustion chamber 121. Closing of this valve stops the engine.

Referring to the modification disclosed in Figs. 24 and 27, a screen 371 (Fig. 27) similar to the screen shown in Fig. 10, is placed in the port in the liner 122 of the combustion chamber 121 and prevents burning combustible fluid from the combustion chamber 121 entering the supply conduits 132ª and igniting the fresh charge of combustible mixture in these conduits.

In general, the difference between the preferred form and the modified form may be summed up in the following statement,— that the modified form is similar in all respects with the construction of the preferred form except that the means for compressing the air with its accessories for delivering the compressed air to the motor cylinders has been eliminated.

In order to rotate the rotary abutment and the valve 137 in the combustion chamber 121 of both forms, I employ a system of worm gearing between the crank shaft 24, the rotary abutment shaft 74 and the rotary valve shaft 168.

Referring to Figs. 17 and 18, a helical gear 352 is keyed to the forward end of the crank shaft 24 and is adapted to mesh with a helical gear 354 which is keyed to a vertical shaft 355. The helical gear 352 and the helical gear 354 are mounted within a casing 356 with the shaft 355 journaled in the upper end of the casing.

The reduced upper end of the shaft 355 is provided with helical gears 357 and 358 which are located within the housing 359. The gear 357 is in mesh with a gear 360 which is mounted on the end of the stub shaft 168. The worm gear 358 on the vertical shaft 355 is in mesh with a worm 361 which is keyed to the end of the rotary abutment shaft 74, the relationship between the gearing being such that the rotary abutment is rotated at twice the speed of the shaft 24, while the shaft 168 and likewise the valve 137 are rotated at the same speed of the rotary abutment. The helical gearing is employed in engines of the larger type while spur gearing is employed in smaller engines.

Referring to Figs. 9 and 10, it will be seen that certain additional gears are necessary to operate the valve 134, at the same speed of the engine rotor, but which will be at one-half speed of the valve 137 and the rotary abutments. The spur gear 169 keyed to the stub shaft 167 is in mesh with the spur gear 170 keyed to the stub shaft 168, and is rotated by the gear 170 when the stub shaft 168 is operated through the worm 360 which is operatively connected with the engine shaft.

In the modified form of gearing shown in Figs. 19, 22 and 23, a spur gearing is employed for operating the rotary abutments and the valves 137 instead of the helical gearing. There are two sets of these spur gears, one set located between the rotors of the engine and another between the rotors of the low pressure compressors. The large spur gear 175, keyed to the shaft 24, is revolved at one-half the speed of the spur gearing 174 which actuates the rotary abutment also at one-half the speed of the spur gear 170 which actuates the valve 137 with the spur gears 170 and 174 in mesh with the large spur gears 175.

I prefer the use of helical gearing to spur gearing for the reason that the same spaced relation between the rotary abutment, the valves, and the crank shaft may be changed at any time, while the ratio of their speeds may be maintained, or in other words, the ratio of the speeds of these elements may be maintained, and the distance between the centers of the shafts upon which these elements are mounted may be changed. This is not possible with spur gearing. By decreasing or increasing the diameter or varying the pitch of the helical gears, respectively, in mesh with each other, the ratio of the speeds between the driven elements will be maintained. Furthermore, a system of helical gearing is noiseless while the spur gear will rattle when worn.

To the opposite ends of the valve casing 120 of the combustion chamber 121 of the modified form shown in Fig. 27, are secured yokes 372 adapted to support the stub shaft 373 formed integrally with the outer ends of the valves 137 rotatably mounted in the combustion chambers 121 with the shaft 373 passing through the perforated boss 374 of a yoke 372. An appropriate complement of nuts 375 are locked on the stub shaft 373 to maintain the valves in proper position within the combustion chamber 121.

On the end of the rear stub shaft 373 is mounted a timer 280ª, provided with two contacts for causing sparks in the spark plug 281 and 282 at each revolution of the piston blades 34ª in their respective expansion chambers 17 and 18, so that each time a piston blade 34ª has opened the port 127 which connects the combustion chamber with the expansion chamber, a spark will be produced in the spark plug for igniting the compressed combustible mixture in that combustion chamber which is about to be placed in communication with its respective expansion chamber.

The timer of the preferred form is connected to a stub shaft projecting from a valve 137 for operation, whereby a spark is caused in each spark plug at every revolution of the piston structure, while in the modified form, two sparks are produced in each spark plug at each revolution of the respective piston structures.

Referring to the modified form of engine shown in Fig. 27, the stub shaft or trunnion 376 on the inner end of the valve 137 of the first motor is adapted to be received by a hub 377 and keyed to said hub whereby rotation of the valve 137 in the first motor will transmit similar rotation to the valve 137ª of the second motor. This construction of connected valves for simultaneous rotation at the same speeds is similar to the connections between the longitudinally alined valves 137 and 137ª of the preferred form, shown in Fig. 10, and which has been previously described.

The object of compressing the non-inflammable gas is not only for the purpose of promoting circulation of the cooling fluids, but for the reason that this compressed non-inflammable gas acts as a cooling medium in itself, because in the process of compression the said gas is forced to give up its latent or inherent heat, and later when said gas issues through the nozzle casing 246 and passes through the water jackets 303 and 27, it takes up heat again, by expansion, absorbing said heat from its surrounding medium, and thus acting as a cooling medium.

It will be seen that the engine embodies three distinct cooling mediums, namely:— the alternation of the compressed air with the inlet of the charge of explosive mixture which, in itself reduces the heat in the engine; the provision of means for conducting water or other fluids in surrounding relation to the heat-generating parts of the engine, and lastly, the provision of means for the introduction of non-inflammable gas under compression and allowing the same to expand within the jackets to absorb the heat therefrom and further serve to maintain the engine at a minimum degree of heat, and it is to be understood that any one, two or all three of these mediums may be employed.

What is claimed is:—

1. In a combustion engine, a cylinder, a plurality of pistons operating therein, a combustion chamber in communication with the engine cylinder, a source of compressed combustible mixture connected with the combustion chamber, a source of compressed air connected with the combustion chamber, means for controlling the alternate admission of compressed air and the compressed combustible mixture to the combustion chamber, means for igniting the compressed combustible mixture in the combustion chamber, means controlling the admission of the ignited combustible mixture from the combustion chamber to the engine cylinder; the last-mentioned means permitting ready flow of the compressed air to the engine cylinder from the combustion chamber when the means which controls the admission of compressed air to the combustion chamber is open.

2. In a combustion engine, a cylinder, a plurality of pistons operating therein, a combustion chamber in communication with the engine cylinder, a source of compressed combustible mixture connected with the combustion chamber, a source of compressed air connected with the combustion chamber, a valve for alternately controlling the admission of the compressed combustible mixture and the compressed air to the combustion chamber, means for igniting the compressed combustible mixture in the combustion chamber, a valve in the combustion chamber for controlling the admission of the combustible mixture from the combustion chamber to the engine cylinder, said pistons controlling admission of the compressed air from the combustion chamber to the engine cylinder and the valve in the combustion chamber permitting free communication between the combustion chamber and the engine cylinder when the means controlling the admission of compressed air to the combustion chamber is open.

3. In a combustion engine, a cylinder, a piston operating therein, a combustion chamber in communication with the engine cylinder, an auxiliary chamber in communication with the combustion chamber, a source of compressed combustible mixture and a source of compressed air in communication with the auxiliary chamber, a valve for controlling the alternate admission of the compressed combustible mixture and the compressed air to the auxiliary chamber, a valve controlling the admission of the compressed combustible mixture to the combustion chamber and for controlling the exhaust of the compressed combustible mixture when ignited from the combustion chamber to the engine cylinder, means for igniting the combustible mixture in the combustion chamber, said valve permitting ready flow of the compressed air from the auxiliary chamber through the combustion chamber to the engine cylinder.

4. In a combustion engine, a cylinder, a piston operating therein, a combustion chamber in communication with the engine cylinder, an auxiliary chamber in communication with the combustion chamber, a source of compressed combustible mixture and a source of compressed air in communication with the auxiliary chamber, a valve for controlling the alternate admission of the compressed combustible mixture and the compressed air to the auxiliary chamber, a valve controlling the admission of the combustible mixture to the combustion chamber and for controlling the exhaust of the combustible mixture when ignited from the combustion chamber to the engine cylinder, means for igniting the combustible mixture in the combustion chamber, said valve permitting ready flow of the compressed air from the auxiliary chamber through the combustion chamber to the engine cylinder, and cooperating means for operating the valve in the auxiliary chamber at one half the speed of the valve in the combustion chamber.

5. In a rotary combustion engine, a plurality of cylinders, a piston operating in each cylinder, a source of compressed combustible mixture in communication with the engine cylinders, a source of compressed air in communication with the engine cylinders, means for controlling the admission of the compressed combustible mixture and compressed air in alternation to each engine cylinder for effecting the power strokes of the pistons, said means adapted to admit compressed air to one of the cylinders while admitting the combustible mixture when ignited to the other cylinder, and means for igniting the compressed combustible mixture externally of the engine cylinders.

6. In a rotary combustion engine, a plurality of cylinders, pistons operating in each cylinder, a combustion chamber in communication with each cylinder, a source of compressed combustible mixture and a source of compressed air in communication with the combustion chambers, means for controlling the admission of the compressed combustible mixture and compressed air in alternation to each combustion chamber, means for igniting the compressed combustible mixture in the combustion chambers, means admitting the ignited compressed combustible mixture to one of the cylinders from a combustion chamber, and means for simultaneously admitting compressed air to the other cylinder from its respective combustion chamber for effecting the power strokes of the pistons.

7. In a rotary combustion engine, a plurality of cylinders, a piston operating in each cylinder, a combustion chamber in communication with each cylinder, a source of compressed combustible mixture, a storage tank between the combustion chamber and the source for receiving the compressed combustible mixture, a source of compressed air, a second storage tank for receiving the compressed air in communication with the combustion chambers, means for igniting the compressed combustible mixture in the combustion chambers, and means for controlling the admission of the compressed air and the ignited compressed combustible mixture in alternation to the engine cylinders from the combustion chambers for effecting the power strokes of the pistons.

8. In a rotary combustion engine, in combination, a cylinder, a piston operating therein, a plurality of compressors for compressing a combustible mixture, means connecting the compressors with the engine cylinder, an air compressor adapted to deliver compressed air to the cylinder in alternation with the compressed combustible mixture for effecting the power strokes of the piston, means for cutting off the supply of combustible mixture and the compressed air to the engine cylinder, means for admitting air at atmospheric pressure to the engine cylinder whereby the engine will be converted into an air compressor when the supply of combustible mixture and compressed air is cut off, and a storage tank for receiving compressed air from the engine cylinder and the air compressor, the piston in the engine cylinder being operated through its shaft to cause it to function as a compressor when the supply of combustible mixture and compressed air is cut off.

9. In a rotary combustion engine, in combination, a cylinder and a piston operating therein, a plurality of compressors for compressing a combustible mixture, a storage tank, means connecting the compressors with the storage tank for storing the compressed mixture, means connecting the storage tank with the engine cylinder, an air compressor, a storage tank connected to the air compressor with the storage tank also connected to the engine cylinder, means for controlling the flow of the compressed combustible mixture and the compressed air in alternation to the engine cylinder for effecting the power strokes of the piston, means for cutting off the supply of compressed combustible mixture and compressed air to the engine, means admitting air at atmospheric pressure to the engine cylinder whereby the engine will be converted into an air compressor when the supply of combustible mixture and compressed air is cut off, means connecting the engine cylinder with the storage tank for delivering the air compressed in the engine cylinder to the storage tank, the piston in the engine cylinder being operated through its shaft to cause it to function as a compressor when the supply of combustible mixture and compressed air is cut off.

10. In a rotary combustion engine having a cylinder and a piston operating therein, a plurality of compressors for compressing a combustible mixture, a storage tank, means connecting the compressors with the storage tank for storing the compressed mixture, means connecting the storage tank with the engine cylinder, an air compressor, a storage tank connected to the air compressor with the storage tank also connected to the engine cylinder, means for controlling the flow of the compressed combustible mixture and the compressed air in alternation to the engine cylinder for effecting the power strokes of the piston, means for cutting off the supply of mixture and compressed air to the engine, means admitting air at atmospheric pressure to the engine cylinder whereby the engine will be converted into an air compressor when the supply of combustible mixture and compressed air is cut off, an exhaust pipe connected with the engine cylinder, a valve in said exhaust pipe closing communication between said exhaust pipe and the atmosphere, and a conduit connected with the exhaust pipe and the storage tank for compressed air whereby air compressed in the engine cylinder is conducted to the air storage tank when the piston in the engine cylinder is operated through its shaft to cause it to function as a compressor when the supply of combustible mixture and compressed air is cut off.

11. In a rotary combustion engine having a cylinder and a pair of pistons operating therein, a plurality of compressors for compressing a combustible mixture, means connecting the compressors with the engine cylinder, and air compressor connected with the engine cylinder, means for igniting the combustible fluid, means for causing admission of the ignited combustible fluid in alternation with the compressed air for effecting the power strokes of alternate pistons, means for cutting off the supply of the combustible fluid and the compressed air to the engine cylinder, means admitting air at atmospheric pressure to the engine cylinder whereby the engine will be converted into an air compressor when the supply of combustible fluid and air is cut off, a storage tank for receiving the compressed air from the engine cylinder and the air compressor, and means for controlling the flow of the compressed air from the engine cylinder to the storage tank.

12. In a rotary combustion engine having a cylinder and a pair of pistons operating therein, a plurality of compressors for compressing a combustible mixture, means connecting the compressors with the engine cylinder, an air compressor connected with the engine cylinder, means for igniting the combustible mixture, means for causing admission of the ignited combustible mixture for effecting the power stroke of one of the pistons in alternation with the compressed air for effecting the power stroke of the other piston, means for cutting off the supply of the combustible mixture and the compressed air to the engine cylinder, means admitting air at atmospheric pressure to the engine cylinder whereby the engine will be converted into an air compressor when the supply of combustible fluid and air is cut off, a storage tank for receiving the compressed air from the engine cylinder and the air compressor, an exhaust pipe connecting the engine cylinder with the atmosphere and with the storage tank, and a valve in the exhaust pipe for closing the exhaust pipe to the atmosphere while opening communication between the exhaust pipe and the storage tank.

13. In a rotary combustion engine comprising a plurality of cylinders, a plurality of pistons operating in each cylinder, and a combustion chamber in communication with each cylinder, a plurality of compressors for compressing a combustible mixture, a storage tank intermediately connected between the combustion chambers and the combustible mixture compressors, an air compressor operated by the engine, a storage tank for the compressed air intermediately connected between the air compressor and the combustion chambers, means for controlling the admission of the compressed combustible mixture and the compressed air in alternation to the combustion chambers, means for igniting the compressed combustible mixture in the combustion chambers, means controlling the flow of the ignited combustible mixture and the compressed air to the engine cylinders, means for cutting off the supply of the combustible mixture and the compressed air from the combustion chambers, the ignited combustible mixture adapted to effect the power strokes of one of the pistons in each of the cylinders while the compressed air effects the power stroke of the other piston in said cylinders, the power stroke of one piston in a cylinder being effected by the ignited combustible mixture with the simultaneous power stroke of the piston in the other cylinder being effected by the compressed air, and means for cutting off the supply of combustible mixture and the compressed air to the engine cylinder and later admitting air at atmospheric pressure to said cylinder whereby the engine will be converted into an air compressor when the engine is driven through its shaft.

14. In a rotary combustion engine having a plurality of cylinders, a plurality of pistons operating in each cylinder, and a combustion chamber in communication with each cylinder, a plurality of compressors for compressing the combustible mixture, a storage tank intermediately connected between the combustion chambers and the combustible mixture compressors, an air compressor operated by the engine, a storage tank for the compressed air intermediately connected between the air compressor and the combustion chambers, means for controlling the admission of the compressed combustible mixture and the compressed air in alternation to the combustion chambers, means for igniting the compressed combustible mixture in the combustion chambers, means controlling in alternation the flow of the ignited combustible mixture and the compressed air to each of the engine cylinders, means for cutting off the supply of the combustible mixture and the compressed air from the combustion chambers, the ignited combustible mixture adapted to effect the power strokes of one of the pistons in each of the cylinders while the compressed air effects the power stroke of the other piston in said cylinders, means for cutting off the supply of combustible mixture and the compressed air to the engine cylinder and later admitting air at atmospheric pressure to said cylinder whereby the engine will be converted into an air compressor when the engine is driven through its shaft, and a storage tank for receiving the air compressed in the engine cylinder and the air compressed in the independent air compressor.

15. A rotary combustion engine, comprising a casing, an expansion chamber in the casing, pistons movable in the chamber, a combustion chamber external to the expansion chamber and in communication with the expansion chamber and a source of combustible fluid under pressure, said combustion chamber formed by a longitudinal passage in the casing, a hollow sleeve in the passage having a portion cut away providing two annular rings connected by a semi-cylindrical portion, the semi-cylindrical portion having a longitudinal slot adjacent one end forming an exhaust port for the combustion chamber, one of the rings being provided with an opening forming a port for the admission of the combustible fluid under pressure.

16. A rotary combustion engine, comprising a casing, an expansion chamber in the casing, pistons movable in the chamber, a combustion chamber external to the expansion chamber and in communication with the expansion chamber and a source of combustible mixture under pressure, said combustion chamber being formed by a longitudinal passage in the casing, a hollow sleeve in the passage with an admission port at one end connected with the source of supply and an exhaust port running longitudinally of the sleeve, a rotary valve in the sleeve having a passage adapted to communicate with the admission port in the sleeve for admitting the combustible mixture to the combustion chamber, and a semi-cylindrical portion for closing and opening the exhaust port in said sleeve.

17. A rotary combustion engine comprising a casing, an expansion chamber in the casing, pistons movable in the chamber, a combustion chamber external to the expansion chamber and in communication with the same and with a source of compressed combustible mixture, a sleeve lining the combustion chamber and comprising a pair of rings connected by a semi-cylindrical portion, an admission port for the mixture in one of the rings, and an exhaust port formed in the semi-cylindrical portion, a rotary valve operating in the said sleeve and comprising a semi-cylindrical portion adapted to cooperate with the semi-cylindrical portion of the sleeve for closing and opening the exhaust port, a pair of disks connected by the semi-cylindrical portion and rotatable within the respective rings, and a pocket in one of the disks adapted to aline with the admission port in the sleeve for admitting the combustible mixture to the combustion chamber.

18. A rotary combustion engine comprising a casing, an expansion chamber in the casing, pistons movable in the chamber, a combustion chamber external to the expansion chamber and in communication with the same and with a source of compressed combustible mixture, a sleeve partially lining the combustion chamber and comprising a pair of rings connected by a semi-cylindrical portion, an admission port for the compressed mixture in one of the rings, an exhaust port formed in the semi-cylindrical portion, a rotary valve operating in the said sleeve and comprising a semi-cylindrical portion adapted to cooperate with the semi-cylindrical portion of the sleeve for closing and opening the exhaust port, a pair of disks connected by the semi-cylindrical portion and rotatable within the respective rings, a pocket in one of the disks adapted to aline with the admission port in the sleeve for admitting the compressed mixture to the combustion chamber, a packing ring mounted in an annular groove in the disk provided with a pocket, with the ends of the packing ring adjacent the side edges of the pocket, and an annular groove in said disk adjacent the first-mentioned packing ring and likewise provided with a packing ring.

19. In a rotary combustion engine, a casing, a drum mounted concentrically within the casing and forming with the inner wall of said casing an annular expansion chamber, a combustion chamber having an exhaust port connecting the expansion chamber with the combustion chamber, a rotary valve for controlling said port, a source of compressed combustible mixture in communication with the combustion chamber, a source of compressed air connected with the combustion chamber, means for alternately admitting the compressed air and the compressed combustible mixture to the combustion chamber, a rotary abutment having its outer wall rotatable within a groove in the drum, a pocket in the rotary abutment to permit passage of the pistons thereby, said rotary abutment forming opposite ends of the expansion chamber, a valve in the combustion chamber controlling the exhaust port to the expansion chamber, means for igniting the combustible mixture in the combustion chamber, the rotary abutment forming with one of the pistons a restricted expansion chamber to receive the burning gases from the combustion chamber when said piston opens the exhaust port of the combustion chamber, the valve in the combustion chamber permitting open communication between the source of compressed air and the expansion chamber when the other piston begins to open the port to the expansion chamber for admitting compressed air between the other piston and the rotary abutment for effecting the power stroke of the said piston, and an exhaust port on the opposite side of the rotary abutment.

20. In a rotary combustion engine for automobiles, a casing, a drum mounted concentrically within the casing and forming with said casing an annular expansion chamber, pistons movable within the expansion chamber, a combustion chamber connected with a source of compressed air and a source of compressed combustible mixture, means for admitting the compressed air and combustible mixture in alternation to the combustion chamber, means for igniting the combustible mixture in the combustion chamber, a rotary abutment forming opposite ends of the expansion chamber and forming with each of the pistons in alternation a restricted expansion chamber for the burning combustible mixture and the compressed air for effecting the power strokes of the pistons, means for shutting off the combustible mixture and the compressed air to the combustion chamber, a port in the casing opposite to the exhaust port of the combustion chamber for admitting air to the expansion chamber between the pistons, a valve for controlling the admission of air to the expansion chamber, and means for operating the shaft and likewise the pistons for compressing the air in the expansion chamber, and a storage tank for receiving the air compressed by the piston.

21. In a rotary combustion engine for automobiles, a casing, a drum mounted concentrically within the casing and forming with said casing an expansion chamber, pistons movable within the expansion chamber, a combustion chamber connected with a source of compressed air and a source of compressed combustible mixture, means for admitting the compressed air and combustible mixture in alternation to the combustion chamber, means for igniting the combustible mixture, a rotary abutment forming opposite ends of the expansion chamber and forming with each of the pistons in alternation a restricted expansion chamber for the burning combustible mixture and the compressed air for effecting the power strokes of the pistons, means for shutting off the combustible mixture and the compressed air to the combustion chamber, a port in the casing opposite to the exhaust port of the combustion chamber for admitting air to the expansion chamber between the pistons, a valve for controlling the admission of air to the expansion chamber, means for operating the shaft and likewise operating the pistons for compressing the air, a storage tank for receiving the air compressed by the pistons, an exhaust pipe connected with the storage tank for conducting the compressed air from the expansion chamber to the storage tank, and a valve in the exhaust pipe for alternately connecting the exhaust pipe with the storage tank and with the atmosphere.

22. In a rotary combustion engine for automobiles, a casing, a drum mounted concentrically within the casing and forming with said casing an expansion chamber, pistons movable within the expansion chamber, a combustion chamber connected with a source of compressed air and a source of compressed combustible mixture, means for admitting the compressed air and combustible mixture in alternation to the combustion chamber, means for igniting the combustible mixture, a rotary abutment forming opposite ends of the expansion chamber and forming with each of the pistons in alternation a restricted expansion chamber for the burning combustible mixture and the compressed air for effecting the proper strokes of the pistons, means for shutting off the combustible mixture and the compressed air to the combustion chamber, a port in the casing opposite to the exhaust port of the combustion chamber for admitting air to the expansion chamber between the pistons, a valve for controlling the admission of air to the expansion chamber, means for operating the shaft and likewise operating the pistons for compressing the air between the rotary abutment and each of the pistons, a storage tank for receiving the air compressed by the pistons, an exhaust pipe connected with the storage tank for conducting the compressed air from the expansion chamber to the storage tank, a valve in the exhaust pipe for connecting the exhaust pipe with either the storage tank or with the atmosphere, and a check valve located between the storage tank and the exhaust pipe to prevent the return of compressed air to the expansion chamber.

23. In a rotary combustion engine a casing, an expansion chamber within the casing, pistons movable within the casing and adapted to have their power strokes effected in alternation by the expansion of compressed air and ignited combustible mixture under pressure, a combustion chamber in communication with the expansion chamber, means for supplying the combustion chamber with compressed combustible mixture and compressed air in alternation, an auxiliary casing connected with the first-mentioned casing and provided with a rotary valve, said valve comprising a longitudinal member having a semi-cylindrical portion connecting a pair of disks, a port between the valve casing and the combustion chamber, a slot formed in a portion of the periphery of one of the disks, a passage in communication with the source of compressed combustible mixture adapted to aline with the slot for admitting compressed combustible mixture to the combustion chamber, the portion of the valve between the disks permitting a free passage of compressed air through said valve between the supply means and the combustion chamber.

24. In a combustion engine, a casing, an expansion chamber in the casing, pistons movable within the expansion chamber, a combustion chamber with a port leading into the expansion chamber, a valve in the combustion chamber cooperating with the movable pistons for controlling the opening and closing of the port to the expansion chamber, a valve casing connected by a passage with the combustion chamber, a valve in said casing cooperating with the valve in the combustion chamber for controlling the passage between the valve casing and the combustion chamber, conduits connected with a source of compressed air and with a source of compressed combustible fluid communicating with the valve casing, the valve in the valve casing provided with an annular slot connecting the supply conduit for compressed combustible mixture with the passage to the combustion chamber and a pocket in the valve in the combustion chamber to permit the flow of the compressed combustible mixture from said passage into the combustion chamber, a longitudinal pocket in the valve in the valve casing adapted to connect the combustion chamber with the compressed air conduit for admitting compressed air to the combustion chamber with one of the pistons opening the port between the combustion chamber and the expansion chamber to freely admit compressed air to the expansion chamber, the compressed air and the combustible mixture being admitted in alternation to the expansion chamber through the cooperation of the valves and the pistons.

25. In a rotary combustion engine, a casing, an expansion chamber within the casing, pistons movable in the expansion chamber, a combustion chamber in communication with and external to the expansion chamber, a valve casing in communication with the combustion chamber and connected with a source of compressed air and a source of compressed combustible fluid, a valve in the valve casing for controlling the alternate admission of the compressed combustible fluid and the compressed air to the combustion chamber, said valve comprising an elongated semi-cylindrical member with wings forming extensions on opposite sides of the said member and conforming to the curvature of the semi-cylindrical member, annular disks connected to the ends of the semi-cylindrical member, a slot formed in the periphery of one of said disks, an annular groove in said disk, a packing ring in the groove, with the ends of the rings adjacent the opposite ends of the slot in said disk.

26. In a rotary combustion engine, a casing, a drum mounted concentrically with the casing, a tubular member mounted concentrically of the drum and spaced from the walls of the drum, a bearing sleeve mounted concentrically of the tubular member and forming with said member and drum a water jacket, a shaft rotatably mounted within the bearing sleeve, a disk adjacent one end of the sleeve and mounted for rotation on the shaft, and pistons secured at one end to said disk and having shoulder portions abutting a side wall of the disk, said pistons being movable about said drum.

27. In a rotary combustion engine, a casing, a drum mounted concentrically within the casing and secured to one end wall of the same, a tubular member connected with the free end of the drum, a bearing sleeve connected with said end wall and forming with the tubular member and the drum a water jacket, a shaft passing through the bearing sleeve, a bushing on the shaft in engagement with the bearing sleeve, a nut having a threaded engagement with the free end of the bearing sleeve, a collar rigidly connected with the shaft and having one end in engagement with the nut, a disk connected with the collar in engagement with the end of the drum, and rotary blades or pistons connected at one end to the disk and movable about the periphery of the drum.

28. In a rotary combustion engine, a casing comprising vertical side members and a substantially circular member connecting the side members together, a drum connected with one of the side members and extending adjacent the other side member, a bearing sleeve connected with one end member, a tubular member offset from the bearing sleeve and connecting the drum with the sleeve and forming therewith an internal water jacket, a bushing mounted within the tubular bearing sleeve, a shaft mounted for rotation in said sleeve, a nut having a threaded engagement with the free ends of the bearing sleeve, an adjusting nut having a threaded engagement with the nut, a collar rigidly mounted on the shaft with one end adjacent the adjusting nut, a disk mounted on the collar and rotatable within a circular opening in one end of the casing and adapted to engage the free end of the drum, and rotary pistons secured at one end to the rotatable disk.

29. In a rotary combustion engine, a casing, said casing comprising two vertical end members connected by a cylindrical member, a drum mounted concentrically within the casing and connected at one end with one of the vertical members, a shaft mounted for rotation longitudinally of the drum, a disk rigidly connected with the shaft, an annular groove formed in the free end of the drum provided with a packing ring, an annular packing ring mounted on the inner face of the disk adapted to engage the free end of the drum, and blades or pistons connected at one end to the rotatable disk and movable within the casing.

30. In a rotary combustion engine, a casing comprising end members connected together by a cylindrical member, a drum connected at one end to one of the end members, the other end member being provided with an annular opening, a rotatable disk mounted for rotation within the opening in the other end member, a shaft mounted for rotation concentrically of the drum and connected with the rotatable disk, a packing in the free end of the drum in engagement with an annular packing on the inner face of the rotatable disk, and piston blades connected at one end of the rotatable disk.

31. In a combustion engine, a casing comprising two end members and a cylindrical member connecting said end members, a drum connected at one end to one of the end members and provided with an annular shoulder adjacent the connection with the end member, a ring mounted for rotation on the annular shoulder, a shaft mounted for rotation in the drum, an annular disk rigidly mounted on the shaft adjacent the other end member, with the free end of the drum abutting the inner face of said disk, and piston blades connected at their opposite ends to the annular disk and the ring.

32. In a combustion engine, a casing comprising two end members and a cylindrical member connecting said end members, a drum connected at one end to one of the end members and provided with an annular shoulder adjacent the connection with the end member, a ring mounted for rotation on the annular shoulder, a shaft mounted for rotation in the drum, an annular disk mounted for rotation on the shaft adjacent the other end member, with the free end of the drum abutting the inner face of said disk, and piston blades connected at their opposite ends to the annular disk and the ring, the annular disk being rotatable in an opening in an end member.

33. In a combustion engine, a casing comprising two end members and a cylindrical member connecting said end members, a drum mounted concentrically within the casing, a ring mounted for rotation on the drum, a shaft mounted for rotation in the drum, an annular disk mounted for rotation on the shaft in an opening in the other end member, piston blades connected at their opposite ends to the annular disk and the ring, and a packing ring in the periphery of the annular disk engaging the periphery of the opening in the end member, with a packing ring in the face of the disk and engaging an end of the drum.

34. In a combustion engine, a casing comprising two end members and a cylindrical member connecting the said end members, a drum mounted concentrically with the casing, a ring mounted for rotation on the drum, a shaft mounted for rotation in the drum, an annular disk mounted on the shaft in an opening in the other end member, with the free end of the drum abutting the inner face of said disk, piston blades connected at their opposite ends to the annular disk and the ring, and a packing ring in the periphery of the annular disk engaging the periphery of the opening in the end member, with packing rings mounted in the inner and outer faces of the annular ring engaging respectively the drum and the cylindrical member of the casing.

35. In a combustion engine, a casing comprising two end members and a cylindrical member connecting said end members, a drum mounted concentrically within the casing, a ring mounted for rotation on the drum, a shaft mounted for rotation in the drum, an annular disk mounted on the shaft for rotation in an opening in the other end member, piston blades connected at their opposite ends to the annular disk and the ring, the annular disk being rotatable in an opening in an end member, a packing ring in the periphery of the annular disk engaging the periphery of the opening in the end member, with packing rings mounted in the inner and outer faces of the annular ring, and packing strips mounted in grooves in the upper and lower faces of the piston blades and held in position at their opposite ends by means of projections on the packing rings respectively located on the annular disk and the ring.

36. In a rotary combustion engine, a shaft, a piston structure comprising an annular disk rigidly mounted on the shaft, a packing ring seated within a groove on the inner face of the disk, a packing ring located in a groove in the periphery of the disk, an annular ring spaced from the annular disk and connected to said disk by a pair of diametrically disposed piston blades, and a packing ring mounted in a groove in the periphery of the annular ring.

37. In a rotary combustion engine, a shaft, a piston structure comprising an annular disk rigidly connected with the shaft, a packing ring seated within a groove on the inner face of the disk, a packing ring located in a groove in the periphery of the disk, a ring spaced from the annular disk and connected to said disk by a pair of diametrically disposed piston blades, a packing ring mounted in a groove in the periphery of the annular ring, the piston blades being provided with grooves on their upper and lower faces, and packing strips mounted in said grooves.

38. In a rotary combustion engine, a shaft, a piston structure comprising an annular disk rigidly mounted on the shaft, a packing ring seated within a groove on the inner face of the disk, a packing ring located in a groove in the periphery of the disk, a ring spaced from the annular disk and connected to said disk by a pair of diametrically disposed piston blades, a packing ring mounted in a groove in the periphery of the annular ring, the piston blades being provided with grooves on their upper and lower faces, packing strips mounted in said grooves, the packing strips in the periphery of the annular disk being provided with notches adjacent the grooves in the piston blades, with lugs located within said notches adapted to engage corresponding notches in one of the ends of the packing strips, with the opposite ends of the packing strips notched to receive lugs located within notched portions of the packing ring in the annular ring.

39. In a rotary combustion engine, a shaft, a piston structure comprising an annular disk rigidly connected with the shaft, a packing ring seated within a groove on the inner face of the disk, a packing ring located in a groove in the periphery of the disk, a ring spaced from the annular disk and connected to said disk by a pair of diametrically disposed piston blades, a packing ring mounted in an annular groove in the inner and outer peripheries of the annular ring, the piston blades being provided with grooves on their upper and lower faces, packing strips mounted in said grooves, the packing strips in the periphery of the annular disk being provided with notches adjacent the grooves in the piston blades, with lugs located within said notches adapted to engage corresponding notches in one of the ends of the packing strips, with the opposite ends of the packing strips notched to receive lugs located within notched portions of the packing ring mounted on the outer periphery of the annular ring, the packing strips in the inner faces of the piston blades having one of their ends engaged in notches in the packing ring mounted on the inner face of the annular disk, with the opposite ends of the packing strips notched to receive inwardly-projecting lugs on the packing ring mounted on the inner periphery of the annular ring.

40. In a rotary combustion engine, a casing, a rotor in the casing, a shaft operatively connected with the rotor, a rotary abutment in the casing forming the ends of the expansion chamber, a combustion chamber in communication with the expansion chamber, a valve for controlling communication between the combustion chamber and the expansion chamber, a worm on the shaft in mesh with a worm gear on a countershaft, worm gears on the upper end of the countershaft, worms located on opposite sides of the countershaft and each in mesh with one of the gears on the countershaft, the worm on one side of the countershaft adapted to rotate the abutment with the worm on the other side of the shaft adapted to rotate the valve in the combustion chamber, said combustion chamber being connected with a source of compressed combustible gas under pressure and a source of compressed air, a valve for controlling communication between the several sources of the combustible fluid and the compressed air with the combustion chamber, and a gear connected with the rotary valve in the combustion chamber in mesh with a gear for rotating the last-mentioned valve.

41. In a rotary combustion engine, a casing, a compression chamber within the casing, a rotor in the compression chamber, a shaft operatively connected with the rotor, a combustion chamber in communication with the compression chamber, a valve casing connected with a source of combustible fluid under pressure and a source of compressed air, a valve in the valve casing for controlling the flow of compressed air and compressed combustible fluid in alternation to the combustion chamber, a valve in the combustion chamber for controlling the admission of the combustible fluid under expansion and the compressed air to the expansion chamber, gears operatively connecting the shaft with the rotary abutment, the valve in the combustion chamber and the valve in the valve casing, whereby the rotary abutment and the valve in the combustion chamber are rotated at twice the speed of the shaft, with the valve in the valve casing at one-half the speed of the valve in the combustion chamber.

42. In a combustion engine, a combustion chamber, a source of compressed air and a source of compressed combustible mixture connected with the combustion chamber, means for controlling the flow of the compressed fluids to the combustion engine, said means comprising a casing, a sleeve within the casing and provided with circumferential slots, a solid cylindrical valve slidable in the sleeve, annular grooves in the casing in vertical alinement with the circumferential slots in the sleeve, diametrically-disposed ribs projecting inwardly from the casing and in engagement with the cylindrical sleeve member, and passages in the cylindrical valve member adapted to be alined with the circumferential passages in the sleeve to permit the flow of fluid through the valve casing with the annular grooves in the casing in communication with the source of compressed combustible mixture and the source of compressed air.

43. In a combustion engine, a combustion chamber, a source of compressed air and a source of compressed combustible mixture connected with the combustion chamber, means for controlling the flow of the compressed fluids to the combustion engine, said means comprising a casing, a sleeve within the casing and provided with circumferential slots, a solid cylindrical valve slidable in the sleeve, annular grooves in the casing in vertical alinement with the circumferential slots in the sleeve, diametrically-disposed ribs projecting inwardly from the annular grooves in the casing and in engagement with the cylindrical sleeve, passages in the cylindrical valve member adapted to be alined with the circumferential passages in the sleeve to permit the flow of fluid through the valve casing with the annular grooves of the casing in communication with the source of compressed air and compressed combustible mixture, and a diaphragm connected with the valve casing for maintaining the valve in closed position.

44. In a combustion engine, a combustion chamber, a valve casing, a pair of conduits connecting the combustion chamber with the valve casing, a pair of conduits connecting the valve casing with a source of compressed combustible fluid and a source of compressed air, annular channels in the valve casing connecting the respective conduits for compressed air together, and for connecting the conduits for the compressed combustible mixture, a hollow sleeve within the casing and provided with circumferential passages in alinement with the annular grooves in the casing, a solid cylindrical member slidable within the sleeve and provided with passages adapted to be alined with the passages in the sleeve, diametrically disposed ribs on the valve casing and engaging the diametrically opposite points on the sleeve for directing the gas through certain of the circumferential passages in the sleeve.

In testimony that I claim the foregoing as my own, I have hereto affixed my signature.

LANIOUS P. ERB.